US012567202B2

(12) United States Patent (10) Patent No.: US 12,567,202 B2
Nunez et al. (45) Date of Patent: Mar. 3, 2026

(54) COMPUTED SYSTEMS LAYOUT LEVERAGING AUGMENTED REALITY IN THE DATA CENTER

(71) Applicant: NetApp, Inc., San Jose, CA (US)

(72) Inventors: Michael K. Nunez, Lyons, CO (US); Vincent G. Taluskie, Louisville, CO (US)

(73) Assignee: NetApp, Inc., San Jose, CA (US)

( * ) Notice: Subject to any disclaimer, the term of this patent is extended or adjusted under 35 U.S.C. 154(b) by 294 days.

(21) Appl. No.: 18/160,540

(22) Filed: Jan. 27, 2023

(65) Prior Publication Data

US 2023/0394753 A1 Dec. 7, 2023

Related U.S. Application Data

(60) Provisional application No. 63/348,596, filed on Jun. 3, 2022.

(51) Int. Cl.
| | |
|---|---|
| *G06T 17/00* | (2006.01) |
| *G06F 3/0486* | (2013.01) |
| *G06T 7/70* | (2017.01) |
| *G06T 19/20* | (2011.01) |
| *G06V 20/20* | (2022.01) |

(52) U.S. Cl.
CPC ................ *G06T 17/00* (2013.01); *G06T 7/70* (2017.01); *G06T 19/20* (2013.01); *G06V 20/20* (2022.01); *G06F 3/0486* (2013.01); *G06T 2200/24* (2013.01); *G06T 2207/20092* (2013.01); *G06T 2219/2004* (2013.01)

(58) Field of Classification Search
None
See application file for complete search history.

(56) References Cited

U.S. PATENT DOCUMENTS

| | | | |
|---|---|---|---|
| 8,773,467 B2 | 7/2014 | Chen-Quee et al. | |
| 9,838,844 B2 | 12/2017 | Emeis et al. | |

(Continued)

OTHER PUBLICATIONS

Dell EMC., "Dell EMC OpenManage Mobile Version 4.0 User's Guide (Android)," IDRAC Quick Sync Read Feature in PowerEdge Servers, 2020, pp. 1-63.

(Continued)

*Primary Examiner* — Kent W Chang
(74) *Attorney, Agent, or Firm* — Jaffery Watson Hamilton & DeSanctis LLP

(57) ABSTRACT

Systems and methods for creating an instance of a 3D model of an IT component within an AR world coordinate space are provided. According to one embodiment, a layout of a system of IT components may be specified in terms of respective rack unit locations within a rack. Based on a relative position with respect to an anchor component and the location of the anchor component within the coordinate space, a high-accuracy calibrated model of an IT component with reference to which AR entities have been defined for various back panel elements may be used to create an instance of a 3D model of the IT component within the coordinate space. The instantiated 3D model may then be used to precisely overlay the AR entities on corresponding back panel elements within a through-the-lens view of the IT component, for example, to facilitate a guided wire-up of the system.

28 Claims, 27 Drawing Sheets

(56) References Cited

U.S. PATENT DOCUMENTS

| | | | |
|---|---|---|---|
| 10,891,792 B1 * | 1/2021 | Bhushan | G06F 3/011 |
| 10,958,765 B1 | 3/2021 | Sheikh | |
| 10,966,342 B2 | 3/2021 | Lairsey et al. | |
| 11,064,009 B2 | 7/2021 | Nadumane et al. | |
| 11,074,730 B1 | 7/2021 | Nunez | |
| 11,120,636 B2 | 9/2021 | Mittleman et al. | |
| 11,212,239 B2 | 12/2021 | Trivino et al. | |
| 11,347,305 B1 | 5/2022 | Shrestha et al. | |
| 2014/0330511 A1 | 11/2014 | Tison et al. | |
| 2018/0249343 A1 * | 8/2018 | Priest | G06T 17/00 |
| 2019/0041637 A1 | 2/2019 | German et al. | |
| 2019/0266453 A1 * | 8/2019 | Rodriguez | G06V 30/422 |
| 2020/0250863 A1 * | 8/2020 | Shetty | H04Q 1/16 |
| 2020/0286289 A1 * | 9/2020 | Mitchell | G01C 15/002 |
| 2021/0248732 A1 | 8/2021 | Poluri et al. | |

OTHER PUBLICATIONS

NetApp., "AFF A220 or FAS2700 Systems Installation and Setup Instructions," NetApp ONTAP Resources, pp. 1-4.

* cited by examiner

System Configuration
Establishment

Receive input indicative of an anchor component that is part of the desired system configuration
510

Receive input indicative of one or more additional components
that are part of the desired system configuration
520

End

600

600

600

800

800

800

COMPUTED SYSTEMS LAYOUT LEVERAGING AUGMENTED REALITY IN THE DATA CENTER

CROSS-REFERENCE TO RELATED PATENTS

This application claims the benefit of priority of U.S. Provisional Application No. 63/348,596, filed on Jun. 3, 2022, which is hereby incorporated by reference in its entirety for all purposes.

BACKGROUND

Field

Various embodiments of the present disclosure generally relate to augmented reality (AR), computing the layout of various information technology (IT) equipment/components within an AR world coordinate space based on a known placement of the IT components within a rack relative to an anchor component, the creation of 3D models of the IT components, and installation of IT components in data centers. In particular, some embodiments relate to providing AR-assisted, guided wire up instructions for a system of IT components within a rack of a data center based on precise three-dimensional (3D) models of the IT components and their layout within the rack.

Description of the Related Art

IT equipment vendors may sell a variety of types and versions of rack-mounted hardware components. Components may have different geometries and dissimilar front and/or back panel layouts, for example, including the number, type, and positioning of interfaces, switches, and power receptacles. Furthermore, such layouts may change as new models are introduced. As a result, even skilled network technicians or data center technicians may need guidance and/or direction when performing a complex installation task, such as a quad high-availability (HA) wire up.

SUMMARY

Systems and methods are described for creating an instance of a 3D model of an IT component within an AR world coordinate space in which the 3D model includes multiple AR overlay entities. According to one embodiment, a reference component (which may be referred to as an "anchor component") is identified within a through-the-lens view of a subset of multiple IT components mounted within a rack by a portable computer system operating as an augmented reality AR device. A location of a given IT component within the AR world coordinate space may then be determined based on the location of the anchor component within the AR world coordinate space and a placement of the IT component within the rack relative to the placement of the anchor component within the rack. Based on the location of the given IT component, an instance of a 3D model of the given IT component may be created within the AR world coordinate space in which the 3D model includes multiple AR overlay entities corresponding to respective back panel elements of a back panel of the given IT component.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
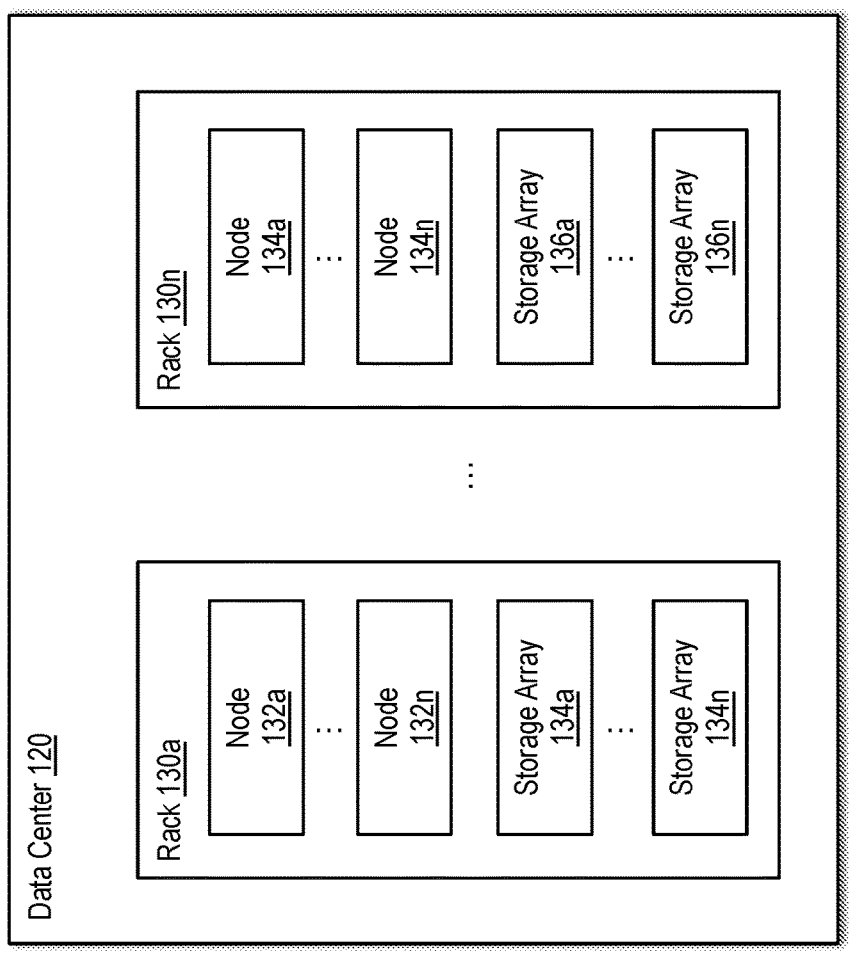
FIG. 1 is a block diagram conceptually illustrating an augmented reality (AR) device and a data center.

Systems and methods are described for creating an instance of a 3D model of an IT component within an AR world coordinate space in which the 3D model includes multiple AR overlay entities. In one embodiment, the instance of the 3D model is created based on a location of the IT component within the AR world coordinate space, which in turn is determined with reference to a location of an anchor component within the AR coordinate space and a physical placement of the IT component within a rack relative to the physical placement of the anchor component within the rack. Such 3D models for a system of IT components may then be used to, among other things, provide AR-assisted, guided wire up instructions for the system of IT components as placed within a rack of a data center.

Given the potential complexity of various system configurations of IT equipment, even with the availability of online installation documentation or physical installation documentation, it may take considerable time for data center technicians to wire up a given system within a rack. Although an experienced data center technician may be generally familiar with the types of rack-mounted hardware components available from a particular vendor, the back panel layout (e.g., positioning of the interfaces, ports, rocker switches, power receptacles and the like) of the back panel may differ from model to model. In order to simplify installation and reduce the potential for wiring errors, embodiments described herein propose providing step-by-step interactive and visual installation instructions for a particular physical system composition based on image recognition of the components involved via a portable data center administration tool that makes use of AR. Depending upon the particular implementation, installation assistance for a given step of a wire up of a particular physical system composition may include one or more of textual, audio (e.g., text to speech), visual port overlays, and unique cable part identification (e.g., by type of cable and/or part number).

The guided installation described herein allows individuals with vastly different experience levels and backgrounds to deliver identical installations according to recommended sequence and documented best practices.

The portable data center administration tool may be referred to herein as an AR device. The AR device may be in the form of a tablet computer, a smartphone, smart glasses, a headset or the like in which an AR application and a model factory are installed on the AR device or an outboard wireless connected device. For example, when the AR device represents smart glasses, the AR application and the model factory may be installed on a smartphone or tablet paired with the smart glasses or may be installed within the smart glasses.

As described further below, in some embodiments, various AR entities (or simply "entities") may be presented via visualization technology of the AR device, for example, a display associated with the AR device or heads-up-display (HUD). When viewing one or more system components within an equipment rack that are to be wired up via a through-the-lens view (AR view), entities may be overlaid on respective back panels of the one or more system components to call out various back panel elements (e.g., interfaces, ports, rocker switches, power receptacles and the like) to which reference is made by a particular system installation step. For example, in one embodiment, a data center technician may make use of a guided installation process provided by the AR application in which AR entities are presented in the AR view according to computed geometry derived from results of matching a back panel layout of an anchor system component with an image recognition database and based on relative rack unit (RU) (or simply unit (U)) placement of the various other system components. The model factory may include a high-accuracy calibrated model for each of multiple types of system components with reference to which the entities have been associated, thereby facilitating identification of back panel elements at millimeter-precision accuracy. For example, when viewing a particular system component through the AR view by making use of the relative rack unit placement of the various system components, the AR entities may be precisely overlaid on corresponding back panel elements based on rack-specific geometries (e.g., at the rack chassis port level). While in the context of various examples, direct overlays of hardware are used for purposes of illustration, it is to be noted in alternative embodiments an AR renderer may be selectable to produce different types of overlays, for example, with reference to paper targets (e.g., mockups of actual hardware) or in the form of a digital twin. The digital twin AR renderer may produce an image of the system components side-by-side with the rack rather than overlaying content on top of the system components. The digital twin AR renderer may be beneficial, for example, when cable occlusion is a concern.

While in various examples described herein, the system may represent a distributed storage system including a storage controller component and multiple disk shelf components operable to provide high availability, the guided installation approach described herein is generally applicable to other types of systems of rack-mounted hardware components. Similarly, while various examples make reference to an 42U rack, the methodologies described herein are applicable to larger (e.g., 48U or 70U) and/or smaller (e.g., 27U or 22U) racks.

Although various examples may focus on core components of a given physical, in-rack layout of a system of components within a rack, it is to be appreciated the rack composition may include additional ancillary components, including, but not limited to, network switches, routers, and power management. Such additional ancillary components may also be participants in the guided installation approach described herein.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Example AR Device and Data Center

FIG. 1 is a block diagram conceptually illustrating an augmented reality (AR) device 110 and a data center 120. In the context of the present example, the AR device 110 is shown including an AR application 112 and a model factory 114. In one embodiment, the AR device 110 may be a portable data center administration tool (e.g., in the form of a tablet computer, a smartphone, smart glasses or the like) that makes use of AR to facilitate efficient installation of system components (e.g., nodes 132a-n and storage arrays 134a-n and/or nodes 134a-n and storage arrays 136a-n) by a data center technician within a rack (e.g., rack 130a or rack 130b) of the data center 120. The AR device 110 may guide a data center technician or other end user performing a system installation through various phases by running the AR application 112, which may contain relevant model factory elements, for example, derived from a build repository.

In one embodiment, the various phases include establishment of a system configuration of a set of system components (e.g., IT equipment in the form of rack-mounted hardware), establishment of a layout of the system components, and guided installation. The system configuration establishment phase may include designation or selection of the set of system components from an available set of hardware components available from one or more vendors as shown and described with reference to FIGS. 5 and 6A-C. A precise 3D model of hardware components available from one or more IT equipment vendors and corresponding AR entities for all or some subset of back panel elements of each of the available set of hardware components may be maintained within the model factory 114. The model factory 114 may represent an AR framework (e.g., RealityKit framework and/or ARKit framework available from Apple) that includes a database of AR entities and their respective X, Y, and Z coordinates relative to a particular reference point of the hardware component with which they are associated. AR frameworks generally allow anchoring of 3D content to a specific location in the real world, thereby facilitating placement of AR entities in AR world coordinate space. For example, Pixar's Universal Scene Description standard (USDZ) may be used for presenting AR and/or 3D content on Apple devices (e.g., Apple iPads and Apple iPhones). Non-limiting examples of precise 3D models of particular hardware components and AR entities are shown and described with reference to FIGS. 2A-B.

The layout establishment phase may involve communication of a physical, in-rack layout of the system components within a rack (e.g., rack 130a or rack 130b) to the AR application 112, for example, via a drag-and-drop interface, as shown and described with reference to FIGS. 7 and 8A-C. The guided installation phase may facilitate efficient and error-free wire up of the system components by presenting step-by-step installation instructions on visualization technology associated with the AR device 110. Additionally, for each installation step of a system installation process (or a particular step of the system installation process), relevant AR entities may be overlaid within an AR view to call the data center technician's attention to the back panel elements involved in the particular installation step as shown and described with reference to FIGS. 11A-J.

The various functional units (e.g., the AR application 112 and the model factory 114) described herein, and the processing described below with reference to the flow diagrams of FIGS. 5, 7, and 9 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms (e.g., servers, blades, network storage systems or appliances, and storage arrays, such as the computer system described with reference to FIG. 12 below.

Example AR Entities

Figure 2A:
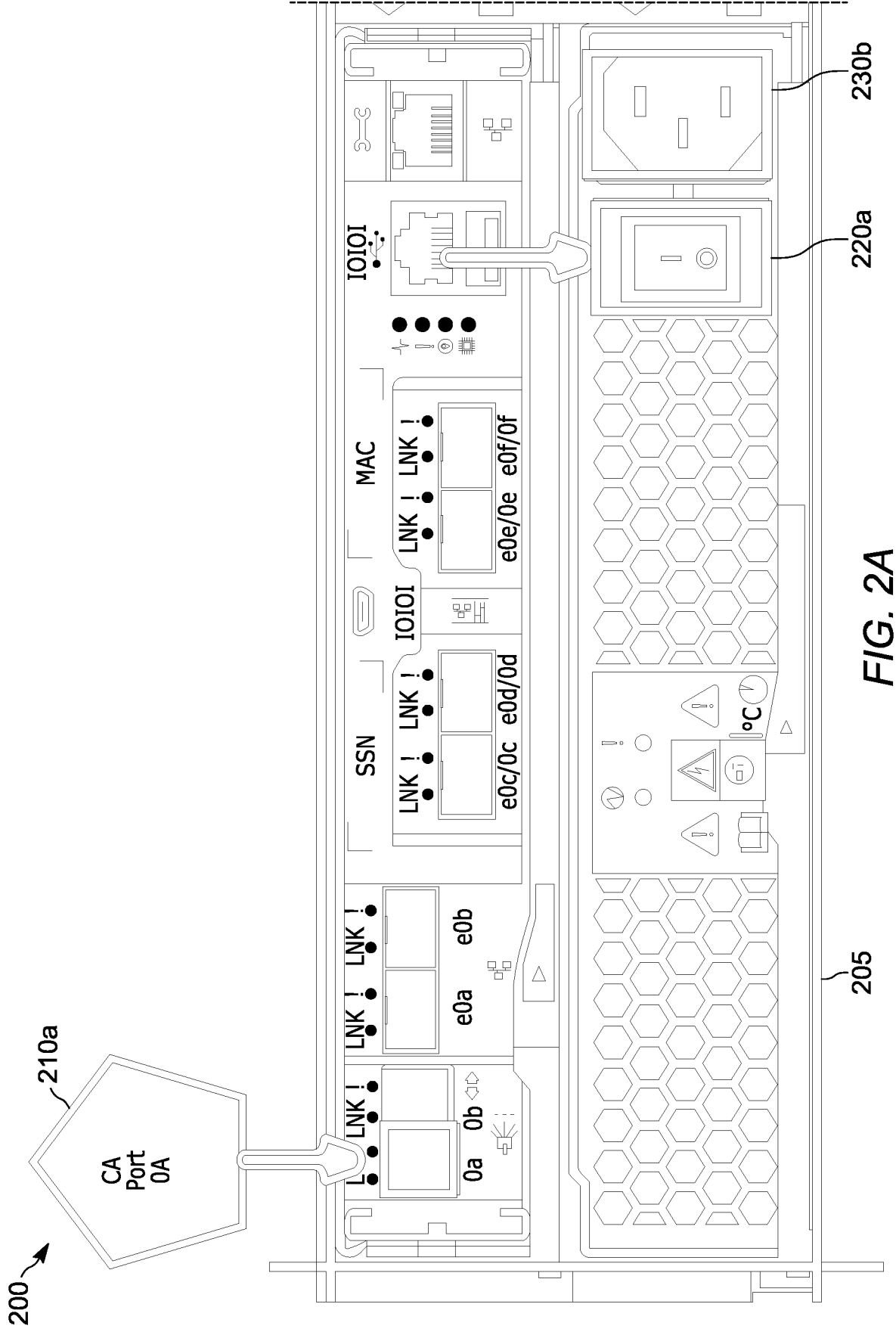
FIG. 2A is a block diagram illustrating various types of AR entities that may be part of a three-dimensional (3D) model of a first type of system component in accordance with an embodiment of the present disclosure.
Figure 2A:
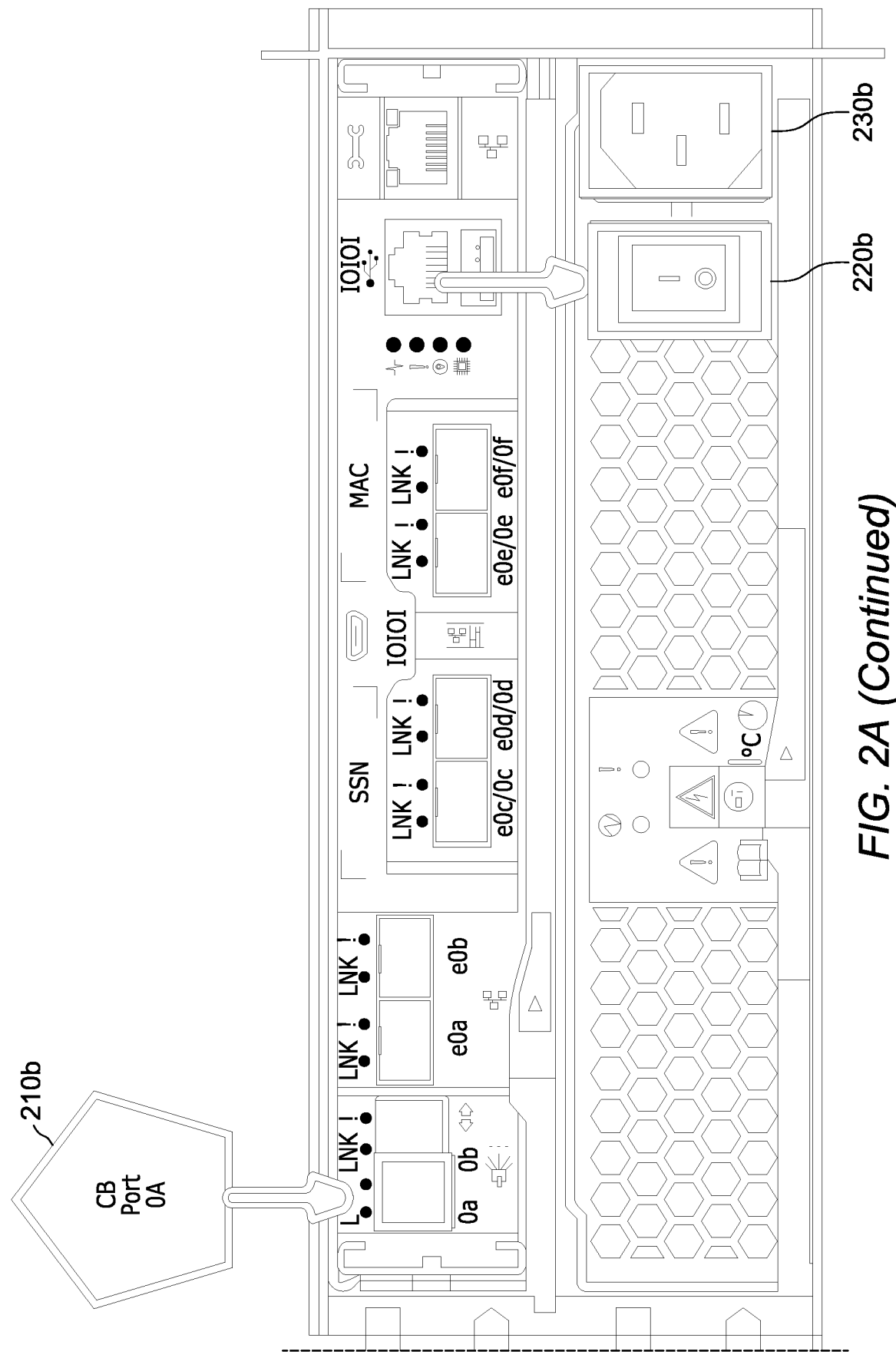

FIG. 2A is a block diagram illustrating various types of AR entities that may be part of a three-dimensional (3D) model 200 of a first type of system component in accordance with an embodiment of the present disclosure. In the context of the present example, the first type of system component represents a dual storage controller component that includes a pair of redundant controllers to facilitate high-availability (HA) storage configurations when wired appropriately with multiple disk shelves. A primary controller (or A-side controller) is depicted on the left-hand side and a secondary (or B-side controller) is depicted on the right-hand side.

The precise 3D model 200, which may have been created within a model factory (e.g., model factory 114), includes a number of different types of AR entities, including a bounding box 205, multiple port badges 210*a-b* (which may also be referred to as port locators or port labels), multiple power rocker switch locators 220*a* and 220*b*, and multiple power receptacle locators 230*a* and 230*b* overlaid on top of a precise model of the back panel layout of the first type of component.

Bounding box 205 may generally represent a rectangle outlining the perimeter of the back panel of the first type of hardware component. The bounding box 205 may be made visible within the AR view to identify the first type of hardware component as the current "anchor component" of the system layout. The anchor component may serve as a reference component for purposes of determining the location of other IT components of the system within an AR world coordinate space based on their relative physical locations (e.g., as indicated by RU locations) within a rack. For example, as explained further below with reference to FIG. 3, the X, Y, and Z coordinates of the anchor component in a world coordinate space may be used to establish the relative positioning of the other system components (as well as their respective AR entities) based on an established system component layout within the rack.

In this example, port labels 210*a* and 210*b* each include a filled or unfilled box over the OA port of the A-side controller and the B-side controller, respectively, an arrow pointing at the port at issue, and a pentagon-shaped badge including a textual label identifying the port at issue.

In this example, power rocker switch locators 220*a* and 220*b* each include a filled or unfilled rectangular overlay corresponding to the position of a power rocker switch of the A-side controller and the B-side controller, respectively, and an arrow-like graphic pointing to the rectangular overlay.

In this example, power receptacle locators 230*a* and 230*b* each include a filled or unfilled rectangular overlay corresponding to the position and the precise outline of a power receptacle of the A-side controller and the B-side controller, respectively.

Figure 2B:
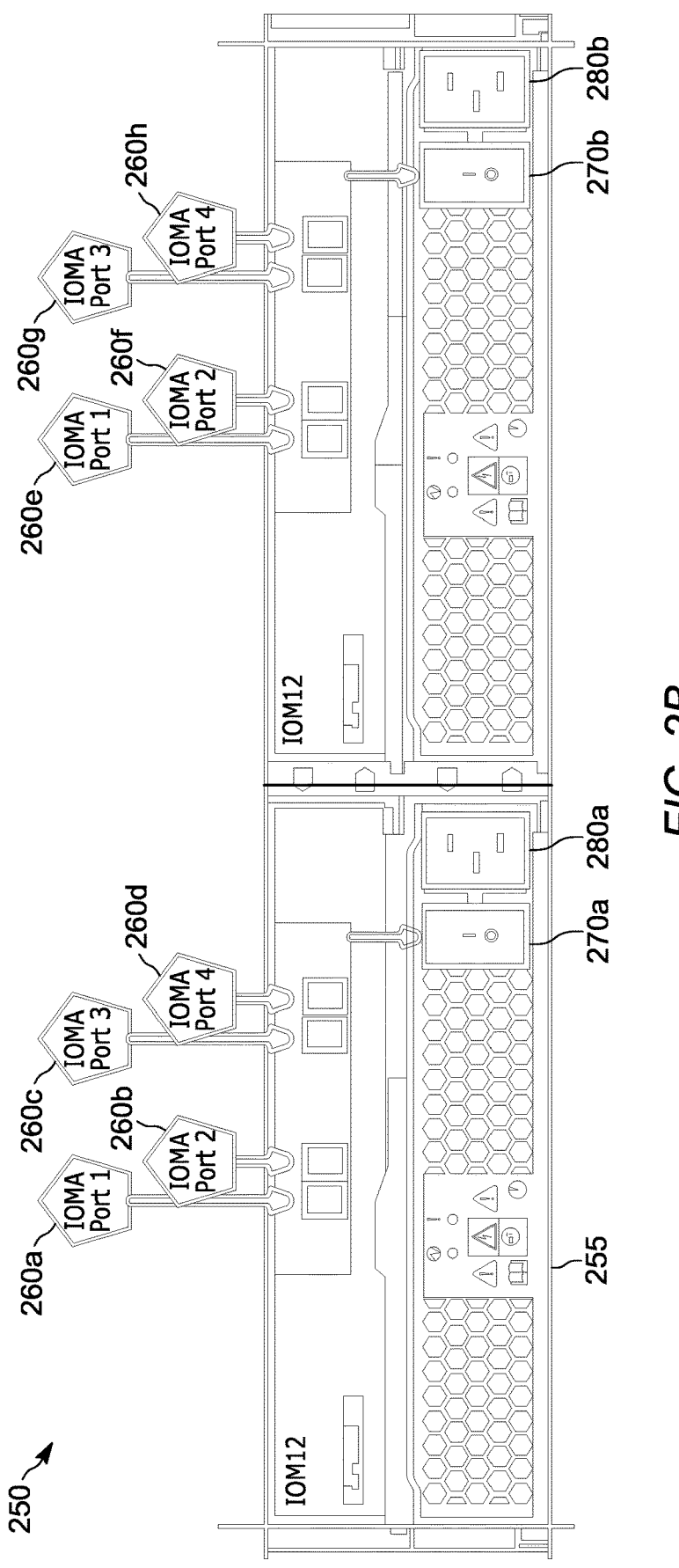
FIG. 2B is a block diagram illustrating various types of AR entities that may be part of a 3D model of a second type of system component in accordance with an embodiment of the present disclosure.

FIG. 2B is a block diagram illustrating various types of AR entities that may be part of a 3D model 250 of a second type of system component in accordance with an embodiment of the present disclosure. In the context of the present example, the second type of system component represents a disk shelf or a storage array component that includes a number of storage devices (e.g., hard-disk drives and/or solid-state drives) which may be coupled in communication with the dual storage controller illustrated in FIG. 2A. The storage array is shown including an input/output (I/O) module (TOM) A on the left-hand side and TOM B on the right-hand side.

The precise 3D model 250, which may have been created within a model factory (e.g., model factory 114), includes a number of different types of AR entities, including a bounding box 255, multiple port badges 260*a-h* (which may also be referred to as port locators or port labels), multiple power rocker switch locators 270*a* and 270*b*, and multiple power receptacle locators 230*a* and 230*b* overlaid on top of a precise model of the back panel layout of the first type of component. In one embodiment, coordinates utilized by the 3D models may be defined with reference to an origin located at the center point of the component at issue in the X, Y, and Z dimensions of the component.

Bounding box 255 may generally represent a rectangle outlining the perimeter of the back panel of the second type of hardware component. The bounding box 255 may be made visible within the AR view to identify the second type of hardware component as the current "anchor component" of the system layout.

In this example, port labels 260*a-d* each include a filled or unfilled box over ports 1-4, respectively, of TOM A, an arrow pointing at the port at issue, and a pentagon-shaped badge including a textual label identifying the port at issue. Similarly, port labels 260*e-h* each include a filled or unfilled box over ports 1-4, respectively, of TOM B, an arrow pointing at the port at issue, and a pentagon-shaped badge including a textual label identifying the port at issue.

In this example, power rocker switch locators 270*a* and 270*b* each include a filled or unfilled rectangular overlay corresponding to the position of a power rocker switch of TOM A and IOM B, respectively, and an arrow-like graphic pointing to the rectangular overlay.

In this example, power receptacle locators 280*a* and 280*b* each include a filled or unfilled rectangular overlay corresponding to the position and the precise outline of a power receptacle of TOM A and IOM B, respectively.

The AR entities of FIGS. 2A-B may be color coded and/or animated so as to stand out and capture the attention of the data center technician when presented in the AR view. While certain shaped outlines, arrows/pointers, and/or badges are illustrated for sake of example, embodiments of the present disclosure are not intended to be limited to any particular shaped outlines, arrows/pointers, and/or badges. Additionally, although some AR entities are shown and described as including multiple visual elements (e.g., a badge, an arrow, and/or a rectangular box) and some AR entities are shown and described as including a single visual element (e.g., a rectangular box), it is contemplated that more or fewer visual elements may be included as part of any particular AR entity.

While the example 3D models shown and described with reference to FIGS. 2A-B, represent core components of a particular storage system configuration, it is to be appreciated other ancillary components may also be part of a given system configuration. Non-limiting examples of such ancillary components may include network switches, routers, power management components, and the like; and each may be a participant in one or more of the various phases of installation described herein (e.g., establishment of a system configuration, establishment of a layout, and guided installation).

Example AR World Coordinate System

Figure 3:
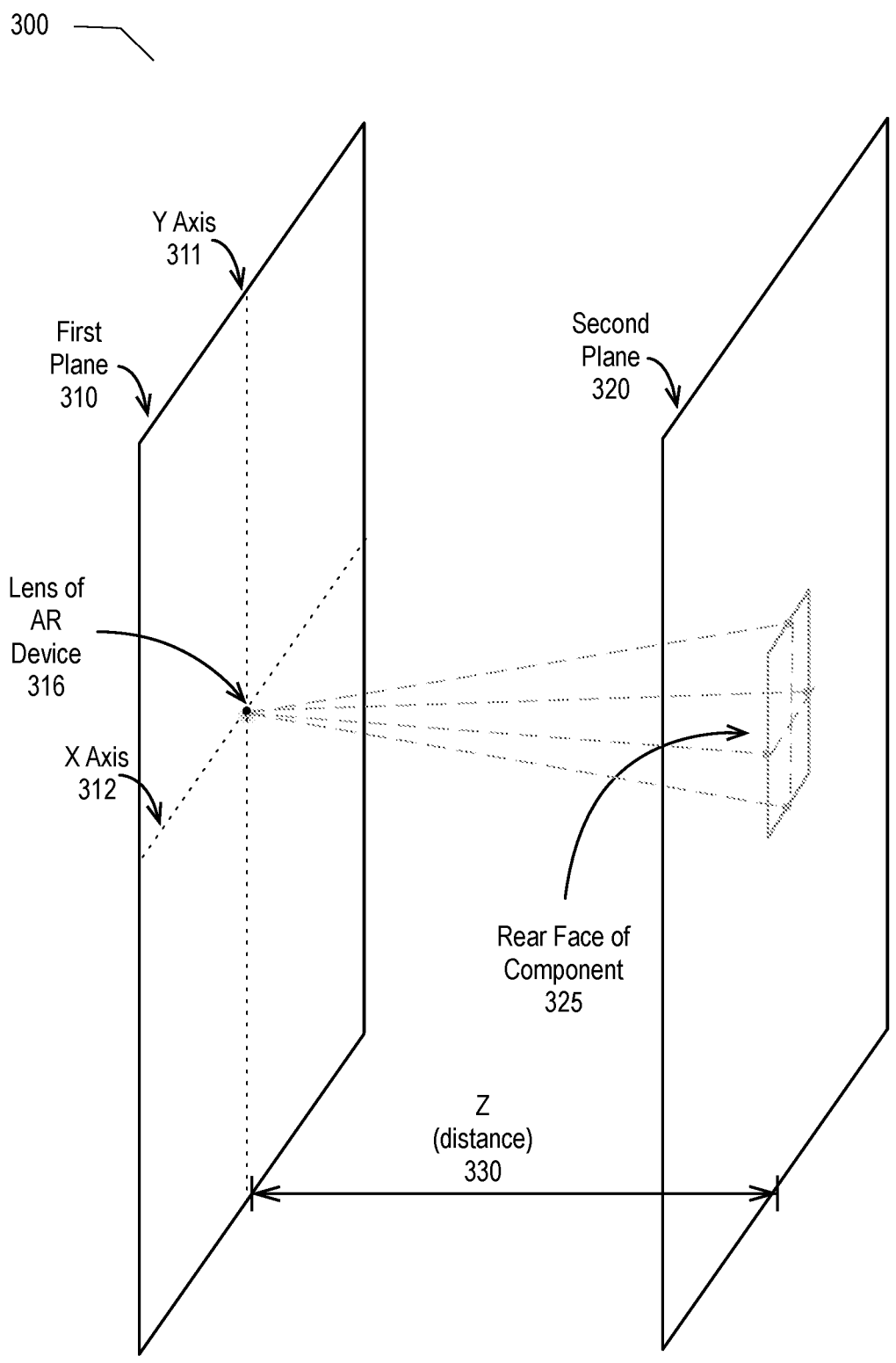
FIG. 3 is a diagram illustrating an AR world coordinate system in accordance with an embodiment of the present disclosure.

FIG. 3 is a diagram illustrating an AR world coordinate system 300 in accordance with an embodiment of the present disclosure. In the context of the present example, a camera lens of an AR device 316 is associated with a first plane 310 within the AR world coordinate system 300 having an X axis 312, a Y axis 312, and a Z axis, which may be used to measure a Z distance 330 between the first plane 310 and a second plane 320 within the AR world coordinate system 300. In one embodiment, the lens of AR device 316 represents a world locator position of (0, 0, 0) within the AR world coordinate system 300 and all real-world objects viewed through the lens of the AR device 316 have one or more (X, Y, Z) coordinates measured with reference to the world locator position.

A rear face (back panel) of a component at issue 325 (e.g., an anchor component of the system) is shown within the second plane 320. As described further below with reference to FIG. 4, a reference point (e.g., a mid-point, a bottom left corner, a top right corner, or the like) within the rear face of component 325 has an (X, Y, Z) coordinate that may be determined by camera driver software of the AR device (e.g., AR device 110) relative to the world locator position. As explained further below, after the position of the anchor component is fixed within the world coordinate system 300, for example, based on image detection of the rear face of the component 325 and based on an established layout of the system components within the rack, a reference point within the rear face of other system components may be determined based on their relative RU offsets within the rack as compared to the anchor component as described further below. In one embodiment, assuming all components have the same depth, all back panels of system components installed in a given rack may be assumed to lie in the same plane (e.g., the second plane 320). Similarly, all system components installed in a given rack may be assumed to be aligned in the X axis. As such, the RU offset (in the Y axis) need only be considered when calculating the Y coordinates as illustrated by Equations #1-4 (below). To the extent the depths of components differ, the calculation of Z coordinates may be adjusted accordingly.

Example Computed System Layout Based on Rack Unit Computations

Figure 4:
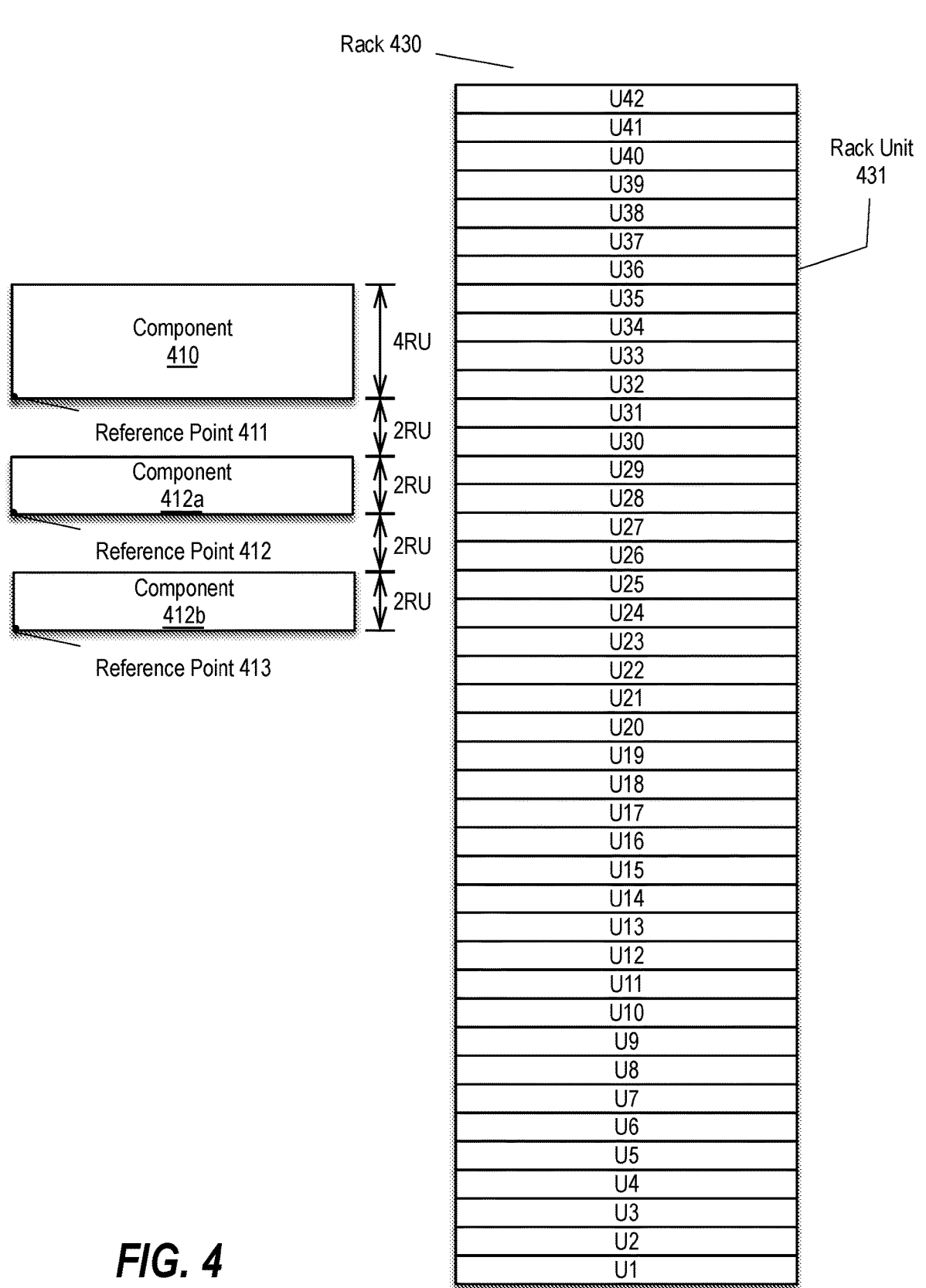
FIG. 4 is a block diagram illustrating system components and a rack in accordance with an embodiment of the present disclosure.

FIG. 4 is a block diagram illustrating system components and a rack 430 in accordance with an embodiment of the present disclosure. In the context of the present example, the rack 430 is a 42RU or 42U rack that includes 42 rack units (RUs) (e.g., RU 431). In the context of the present example, it is assumed a system to be installed includes three system components (e.g., component 410, 412*a*, and 412*b*). Component 410 is a 4RU component that will span 4 RUs of the rack 430 from top to bottom. Components 412*a* and 412*b* are 2RU components that will each span 2 RUs of the rack 430 from top to bottom.

Assuming for sake of example, component 410 represents the anchor component of the system and is to be located within U35, U34, U33, and U32 of rack 430, and components 412*a* are to be located within U29 and U28 and U25 and U24 of rack 430, respectively, reference point 412 within the back panel of component 412*a* is known to be 4 RUs below reference point 411 in AR world coordinate space (e.g., AR world coordinate space 300) and reference point 413 is known to be 8 RUs below reference point 411 in AR world coordinate space (e.g., AR world coordinate space 300). As such, once the (X, Y, Z) coordinates of reference point 411 are established, for example, via image recognition of the back panel of component 410 within the rack 430, coordinates within AR world coordinate space for any given point within the 3D models (e.g., 3D models 200 or 250) of the components may be determined by adding or subtracting as the case may be 1.75 inches for each RU offset from the Y coordinate of the reference point 411 of component 410. Equations #1-4 (below) represent an example of how X, Y, and Z coordinates of a given reference point (e.g., reference point 412) of a given component (e.g., component 412*a*) may be determined based on the known X, Y, and Z coordinates of a reference point (e.g., reference point 411) of an anchor component (e.g., component 410).

$$CRP_x = ARP_x \qquad\qquad \text{EQ \#1}$$

If ARU>CRU:

$$CRP_y = ARP_y - (ARU - CRU) * RU\_Height \qquad \text{EQ \#2}$$

If ARU<CRU:

$$CRP_y = ARP_y + (ARU - CRU) * RU\_Height \qquad \text{EQ \#3}$$

$$CRP_z = ARP_z \qquad\qquad \text{EQ \#4}$$

where, $CRP_x$ is the X coordinate of the reference point of the component $CRP_y$ is the Y coordinate of the reference point of the component $CRP_z$ is the Z coordinate of the reference point of the component $ARP_x$ is the X coordinate of the reference point of the anchor component $ARP_y$ is the Y coordinate of the reference point of the anchor component $ARP_z$ is the Z coordinate of the reference point of the anchor component ARU is the RU number indicative of the RU placement of the anchor component CRU is the RU number indicative of the RU placement of the component RU_Height is a constant (e.g., 1.75 inches) representing of the height of a given RU in real world space.

In Equation #4, it is assumed the depth of the anchor component (e.g., a storage controller) and the depth of the other component (e.g., a disk shelf) are the same. To the extent the depths are different, the Z component of the coordinate can be adjusted by subtracting or adding the difference in depth.

While in the context of the present example, various components may be identified by performing an image recognition process, for example, based on their respective back panels, it is to be appreciated in alternative embodiments, the image recognition may instead be applied to identifiers (e.g., a bar code, QR code, or text label) affixed to respective components. Similarly, while in the context of the present example, a reference point of a given component is assumed to be the bottom, left-corner of the back panel of the component, other corners or the center of the back panel of the component may be used as a reference point.

While in the context of the present example, a 42U rack is shown for purposes of illustration, it is to be understood the methodologies described herein are applicable to larger (e.g., 48U or 70U) and/or smaller (e.g., 27U or 22U) racks. Characteristics of various, non-limiting types of racks are shown below in Table 1.

TABLE 1

| Example Rack Characteristics | | | |
|---|---|---|---|
| Rack Type | Number of Rack Units | Interior Height (in) | Interior Width (in) |
| 22U Rack | 22 | 38.5 | 19 |
| 24U Rack | 24 | 42 | 19 |
| 27U Rack | 27 | 47.25 | 19 |
| 42U Rack | 42 | 73.5 | 19 |
| 45U Rack | 45 | 78.75 | 19 |
| 48U Rack | 48 | 84 | 19 |
| 50U Rack | 50 | 87.5 | 19 |
| 60U Rack | 60 | 105 | 19 |
| 70U Rack | 70 | 122.5 | 19 |

Example System Configuration Establishment

Figure 5:
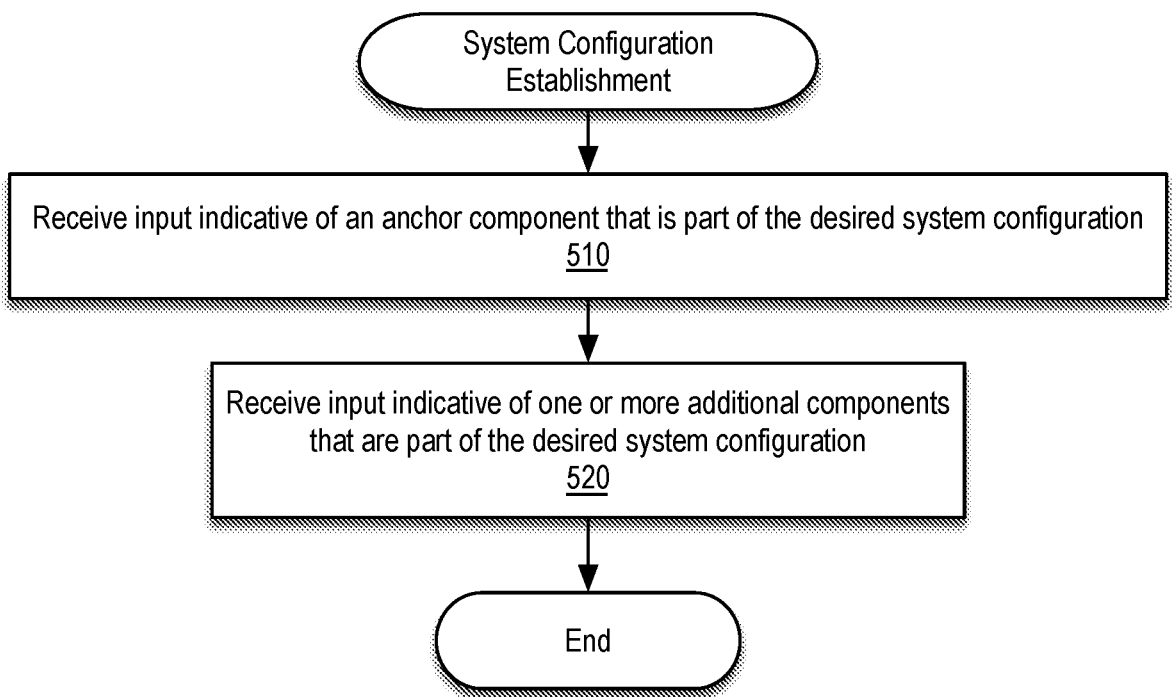
FIG. 5 is a flow diagram illustrating a set of operations for establishing a system configuration in accordance with an embodiment of the present disclosure.

FIG. 5 is a flow diagram illustrating a set of operations for establishing a system configuration in accordance with an embodiment of the present disclosure. In the context of the present example, it is assumed an end user (e.g., a data center technician) is making use of an AR device (e.g., AR device 110) and an AR application (e.g., AR application 112) to establish a system configuration of a number of system components to be installed within a rack (e.g., rack 130a or rack 130b) of a data center 120.

At block 510, input indicative of an anchor component of the desired system configuration is received. The anchor component may be identified by model number, for example, as illustrated in FIG. 6B. Depending upon the particular implementation, the model number of the anchor component may be keyed in via a keyboard or selected from a drop down list presented on a graphical user interface (GUI) by the AR application.

At block 520, input indicative of one or more additional system components that are part of the desired system configuration is received. For example, assuming the additional system components represent disk shelves (e.g., storage arrays), the number of additional system components may be input by the end user as well as the model number of the additional system components, for example, as illustrated in FIG. 6C.

Figure 6A:
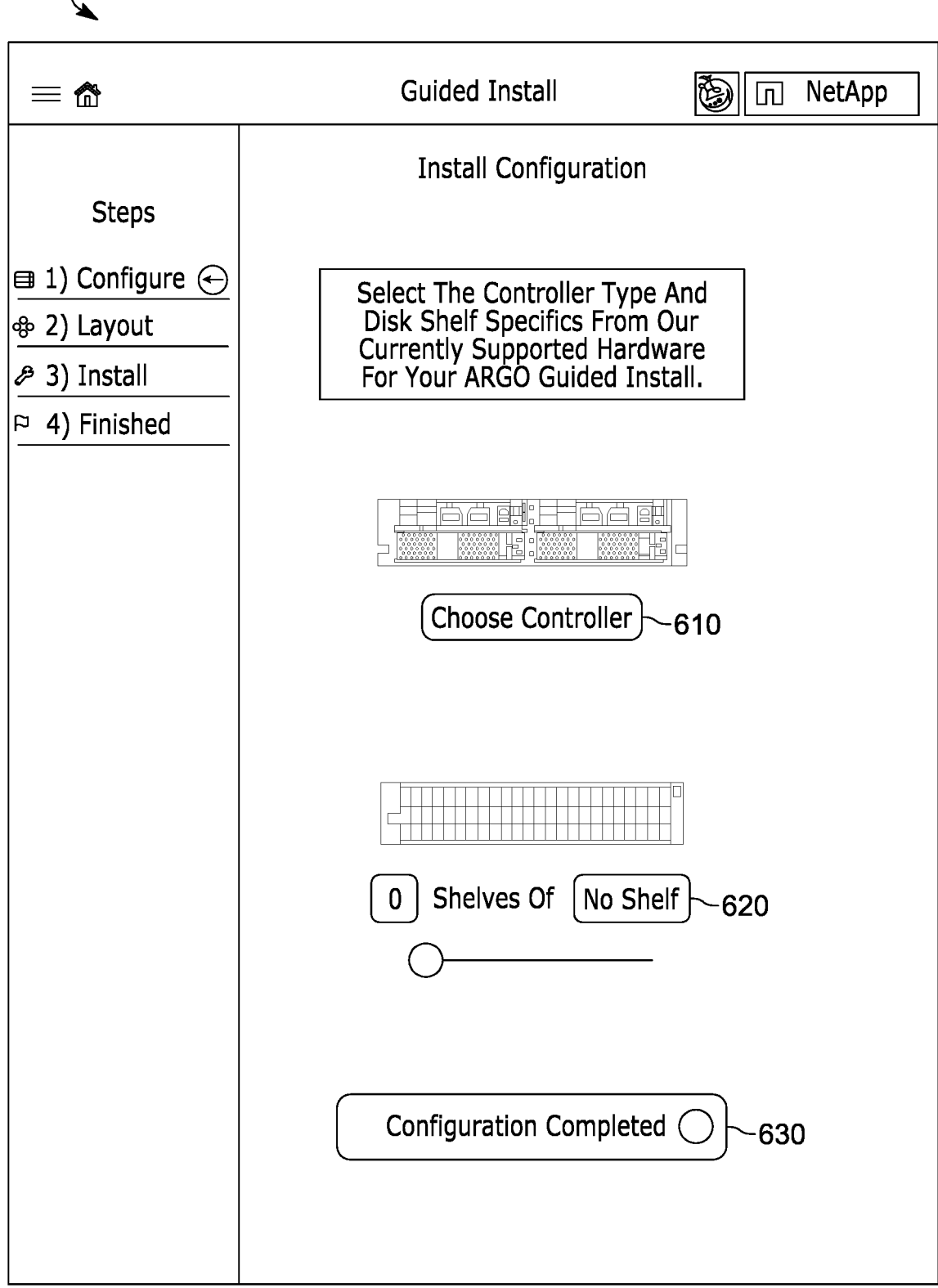
FIG. 6A is a screen shot illustrating an initial state of a configuration user interface in accordance with an embodiment of the present disclosure.
Figure 6B:
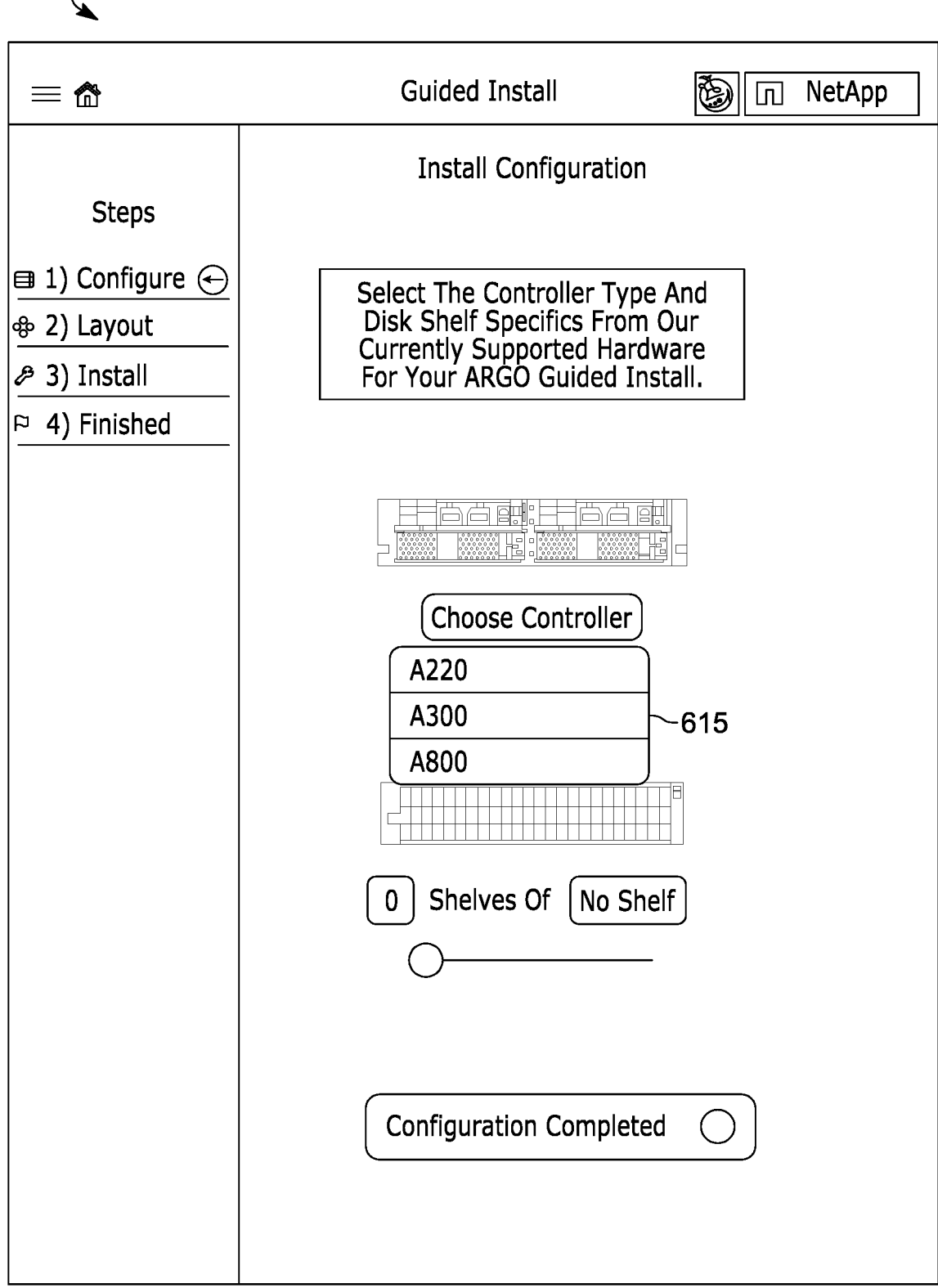
FIG. 6B is a screen shot illustrating a subsequent state of a configuration user interface in which a controller is being selected in accordance with an embodiment of the present disclosure.
Figure 6C:
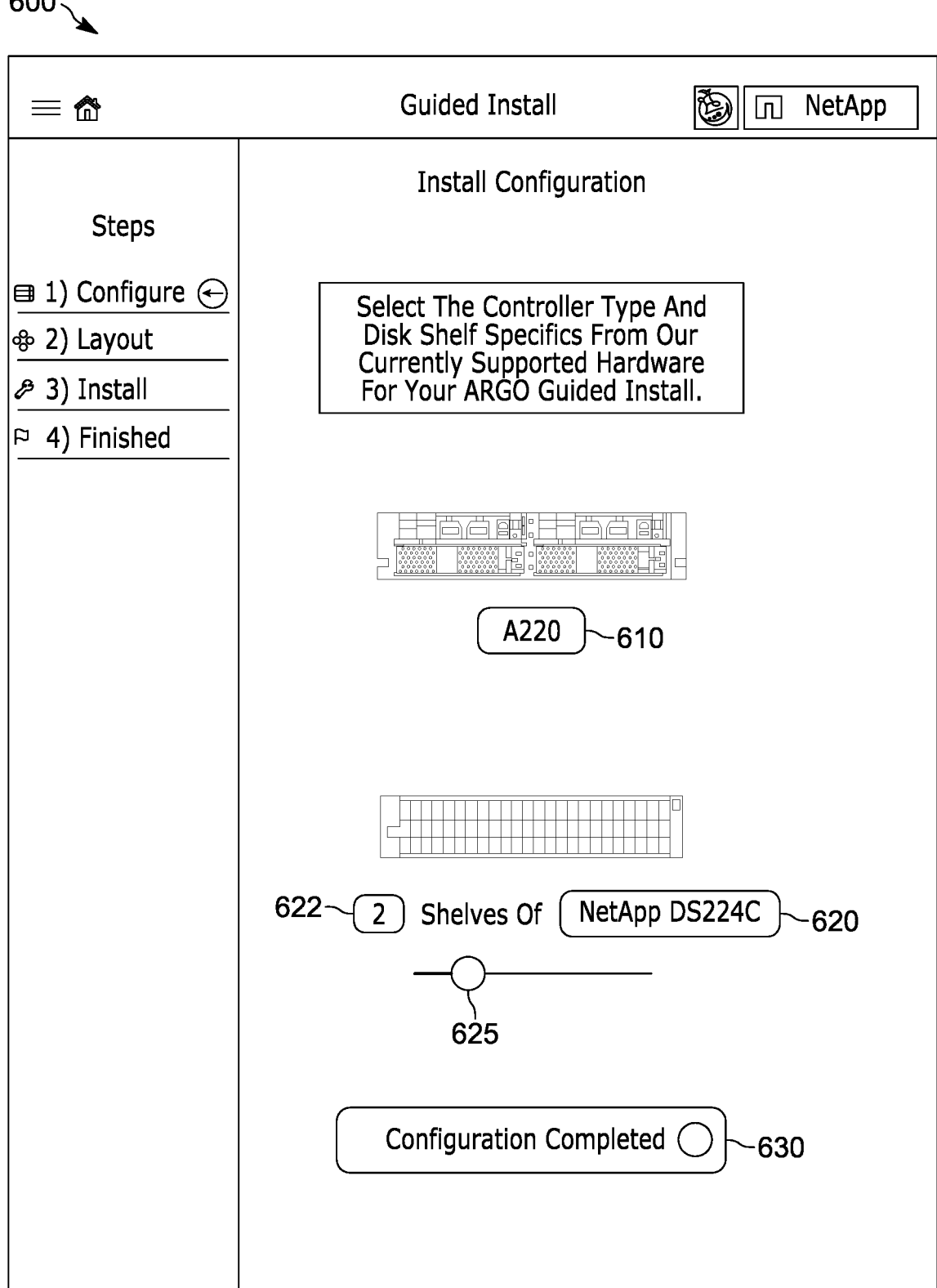
FIG. 6C is a screen shot illustrating a subsequent state of a configuration user interface in which a number and type of disk shelves are being selected in accordance with an embodiment of the present disclosure.

FIG. 6A is a screen shot illustrating an initial state of a configuration user interface 600 in accordance with an embodiment of the present disclosure. In the context of the present example including FIGS. 6A-C, it is assumed a storage controller will represent the anchor component of the system and an end user (e.g., a data center technician) is making use of an AR device (e.g., AR device 110) and an AR application (e.g., AR application 112) to establish a system configuration of a set of system components to be installed within a rack (e.g., rack 130a or rack 130b) of a data center 120 via the configuration user interface 600.

In the initial state of the configuration user interface 600, no controller has yet to be specified. In one embodiment, the end user may select the "Choose Controller" button, for example, via a touch screen interface provided by the display of the AR device, to reveal a drop down list from which the model number of the controller may be selected, for example, as shown in FIG. 6B. Similarly, in the initial state of the configuration user interface 600, no disk shelf has been specified as indicated by the "No Shelf" indicator and the number of shelves to be part of the system configuration has yet to be specified as indicated by the "0" and the image of the empty rack. In one embodiment, the end user may select the "No Shelf" button to reveal a drop down list from which the model number of the disk shelf may be selected, for example, as shown in FIG. 6C. After the desired system configuration has been established, the end user may select the "Configuration Completed" button 630. According to one embodiment, the AR application may limit the ability of an end user to select particular components based on a defined set of system configuration builds. For example, only supported system assembly component combinations may be permitted to be selected from the configuration user interface 600 for inclusion within the system configuration.

While in the context of the present example, the controller component is assumed to be the anchor component (reference component) from which the positioning within the rack of all other system components is determined, in other embodiments, the end user may specify a disk shelf (or another IT equipment component) as the anchor component.

FIG. 6B is a screen shot illustrating a subsequent state of a configuration user interface 600 in which a controller is being selected in accordance with an embodiment of the present disclosure. The subsequent state of the configuration user interface 600 of FIG. 6B represents a non-limiting example of what may be presented to the end user via the display of the AR device responsive to the end user having selected the "Choose Controller" button 610 in FIG. 6A. In the context of the present example, a drop down list 615 including model numbers of available controllers is presented from which the end user may select the desired controller.

FIG. 6C is a screen shot illustrating a subsequent state of a configuration user interface 600 in which a number and type of disk shelves are being selected in accordance with an embodiment of the present disclosure. The subsequent state of the configuration user interface 600 of FIG. 6C represents a non-limiting example of what may be presented to the end user via the display of the AR device responsive to the end user having used the slider bar 625 to indicate 2 shelves are desired to be included as part of the system configuration and having used the "No Shelf" button 620 of FIG. 6A to select the desired disk shelf, for example, from a drop down list of model numbers of available disk shelves.

Example System Component Layout Establishment

Figure 7:
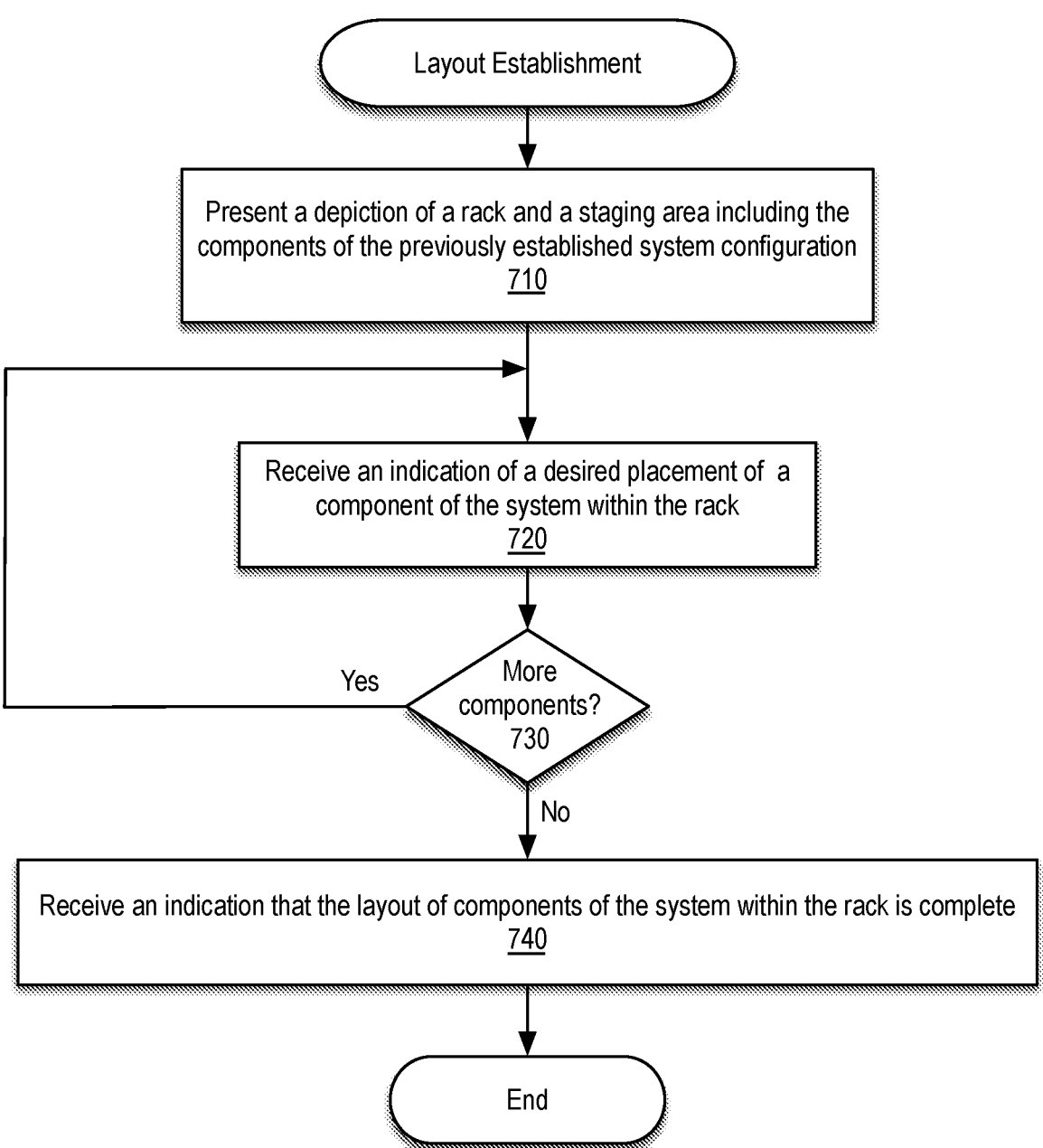
FIG. 7 is a flow diagram illustrating a set of operations for establishing a layout of system components within a rack in accordance with an embodiment of the present disclosure.

FIG. 7 is a flow diagram illustrating a set of operations for establishing a layout of system components within a rack in accordance with an embodiment of the present disclosure. In the context of the present example, it is assumed an end user (e.g., a data center technician) is making use of an AR device (e.g., AR device 110) and an AR application (e.g., AR application 112) to establish a layout of a system configuration (e.g., the system configuration established in FIG. 5 and/or via FIGS. 6A-C) that are to be positioned within corresponding RUs of a rack (e.g., rack 130a or rack 130b) of a data center 120.

Figure 8A:
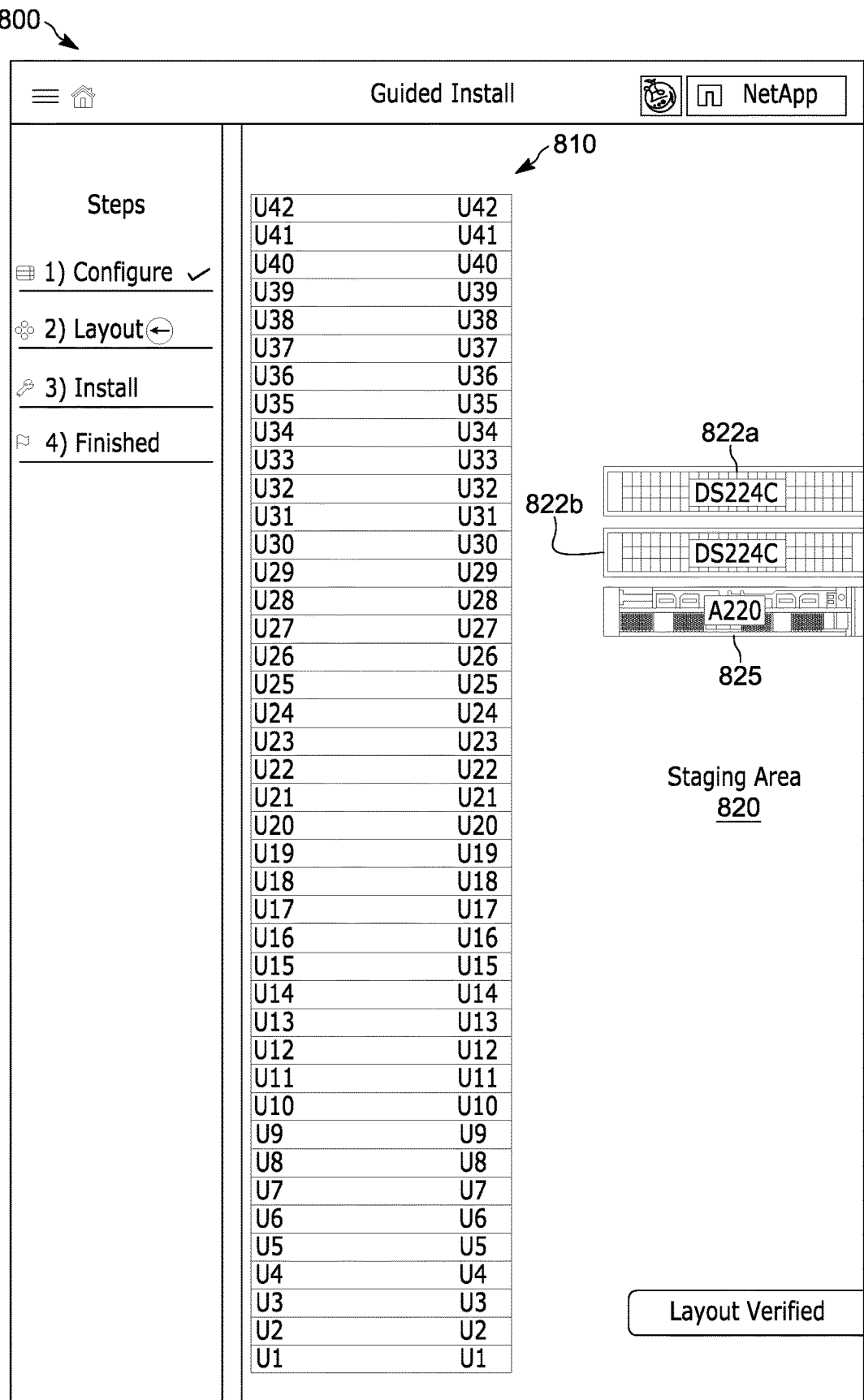
FIG. 8A is a screen shot illustrating an initial state of a layout user interface in accordance with an embodiment of the present disclosure.

At block 710, a depiction of a rack and a staging area may be presented by the AR application on a display of the AR device. The rack may initially be presented in an empty state (with no system components) as shown in FIG. 8A. The staging area may depict graphical representations of the system components of the established system configuration (e.g., 1 storage controller having model number A220 and two disk shelves having model number DS224C), for example, as illustrated in FIG. 8A.

Figure 8B:
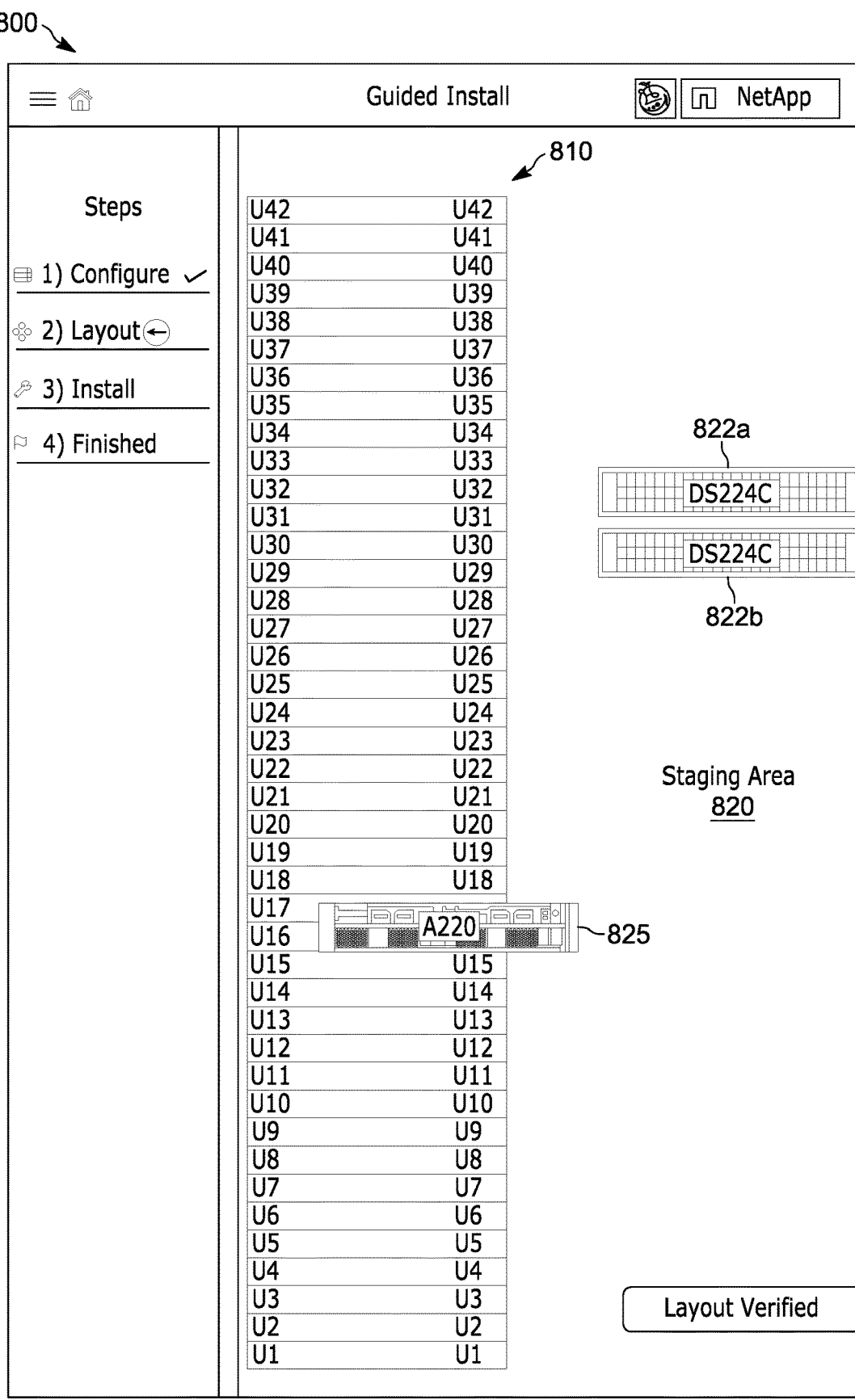
FIG. 8B is a screen shot illustrating a subsequent state of a layout user interface in which a controller component is being placed within a rack in accordance with an embodiment of the present disclosure.

At block 720, an indication is received for a desired placement of a component of the system within the rack. Depending upon the particular implementation, the indication may be provided via a drag-and-drop interface supported by the AR application, for example, as illustrated in FIG. 8B, or the indication may be keyed in (e.g., by selecting the component and specifying the top or bottom RU within the rack).

At decision block 730, it is determined if more system components are available for placement within the rack. If so, the process of receiving information indicative of the desired placement for the remaining system components may continue by looping back to block 720; otherwise, processing continues with block 740.

At block 740, an indication is received that the layout of components of the system within the rack is complete and the layout has been established (subject to the end user returning to the layout establishment process and altering the placement of one or more of the components within the rack). Prior to receiving the indication, the end user may be provided with an opportunity to reset the layout (e.g., return to the initial state in which all system components are in the staging area) and/or to change the location of any of the system components within the rack.

FIG. 8A is a screen shot illustrating an initial state of a layout user interface 800 in accordance with an embodiment of the present disclosure. In the context of the present example including FIGS. 8A-C, it is assumed an end user (e.g., a data center technician) is making use of an AR device (e.g., AR device 110) and an AR application (e.g., AR application 112) to establish the layout (via the layout user interface 800) of a previously established system configuration within a rack 810 (which may be a graphical representation corresponding to the type of rack (e.g., rack 130*a* or rack 130*b*) in which the system is to be installed (e.g., rack 130*a-b* or rack 810 or rack 130*b*).

In the initial state of the layout user interface 800, no system components have yet to be placed within the rack 810 and all graphical depictions of each of the system components (822*a*, 822*b*, and 825) are shown in a staging area 820.

FIG. 8B is a screen shot illustrating a subsequent state of a layout user interface 800 in which a controller component is being placed within a rack 810 in accordance with an embodiment of the present disclosure. The subsequent state of the layout user interface 800 of FIG. 8B represents a non-limiting example of what may be presented to the end user via the display of the AR device responsive to the end user having selected a system component 825 and dragging it to a desired position within the rack 810. This drag-and-drop process may continue until all system components 822*a-b* and 825 are positioned as desired within the rack 810.

Figure 8C:
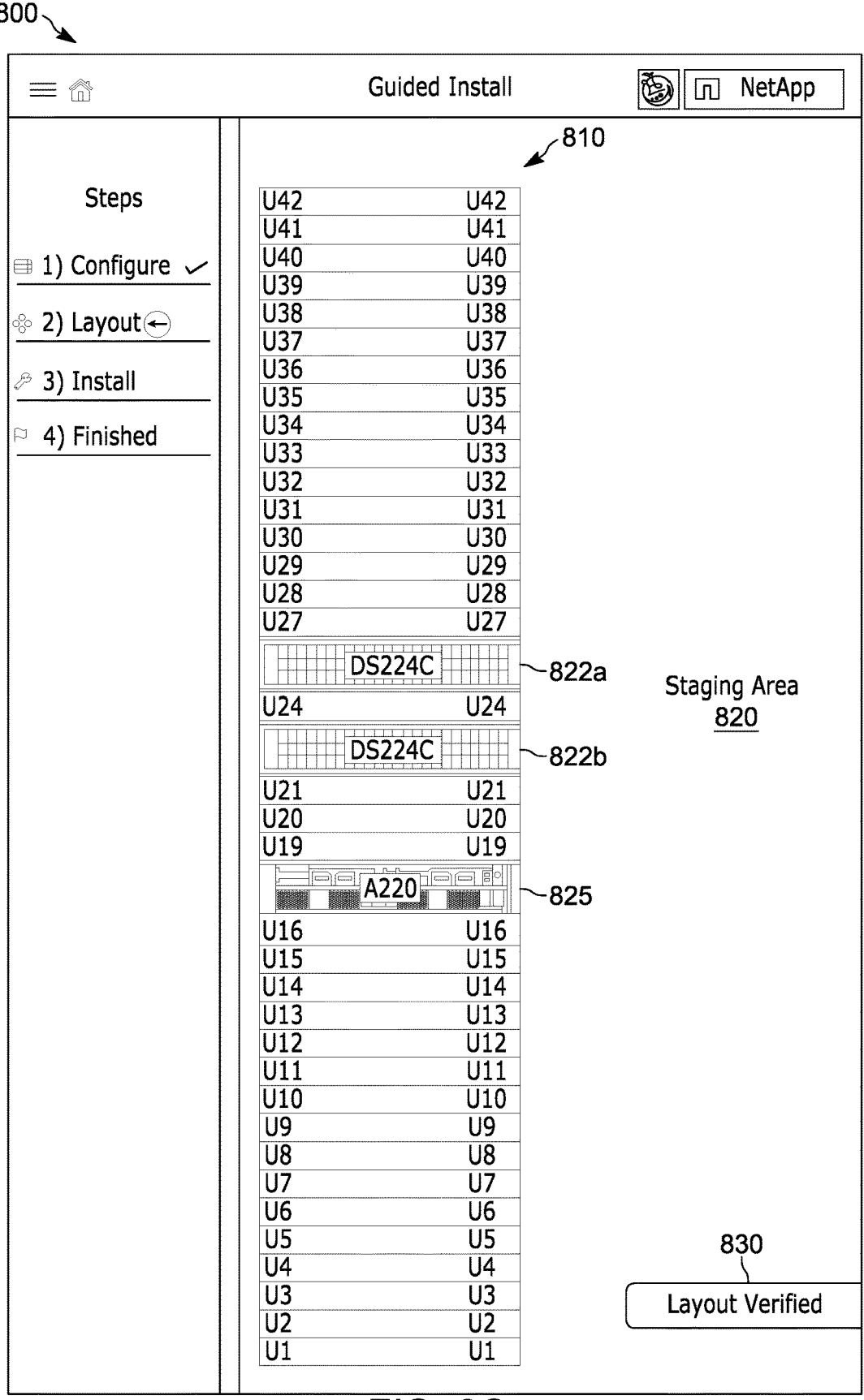
FIG. 8C is a screen shot illustrating a subsequent state of a layout user interface in which all system components have been placed within a rack in accordance with an embodiment of the present disclosure.

FIG. 8C is a screen shot illustrating a subsequent state of a layout user interface 800 in which all system components have been placed within a rack 810 in accordance with an embodiment of the present disclosure. The subsequent state of the layout user interface 800 of FIG. 8C represents a non-limiting example of what may be presented to the end user via the display of the AR device responsive to all system components (previously in the staging area 820) having been moved to a position within the rack 810. For example, after all system components 822*a-b* and 825 have been placed, a "Layout Verified" button may be enabled to allow the end user to communicate to the AR application that the system layout is complete.

Example Guided Installation

Figure 9:
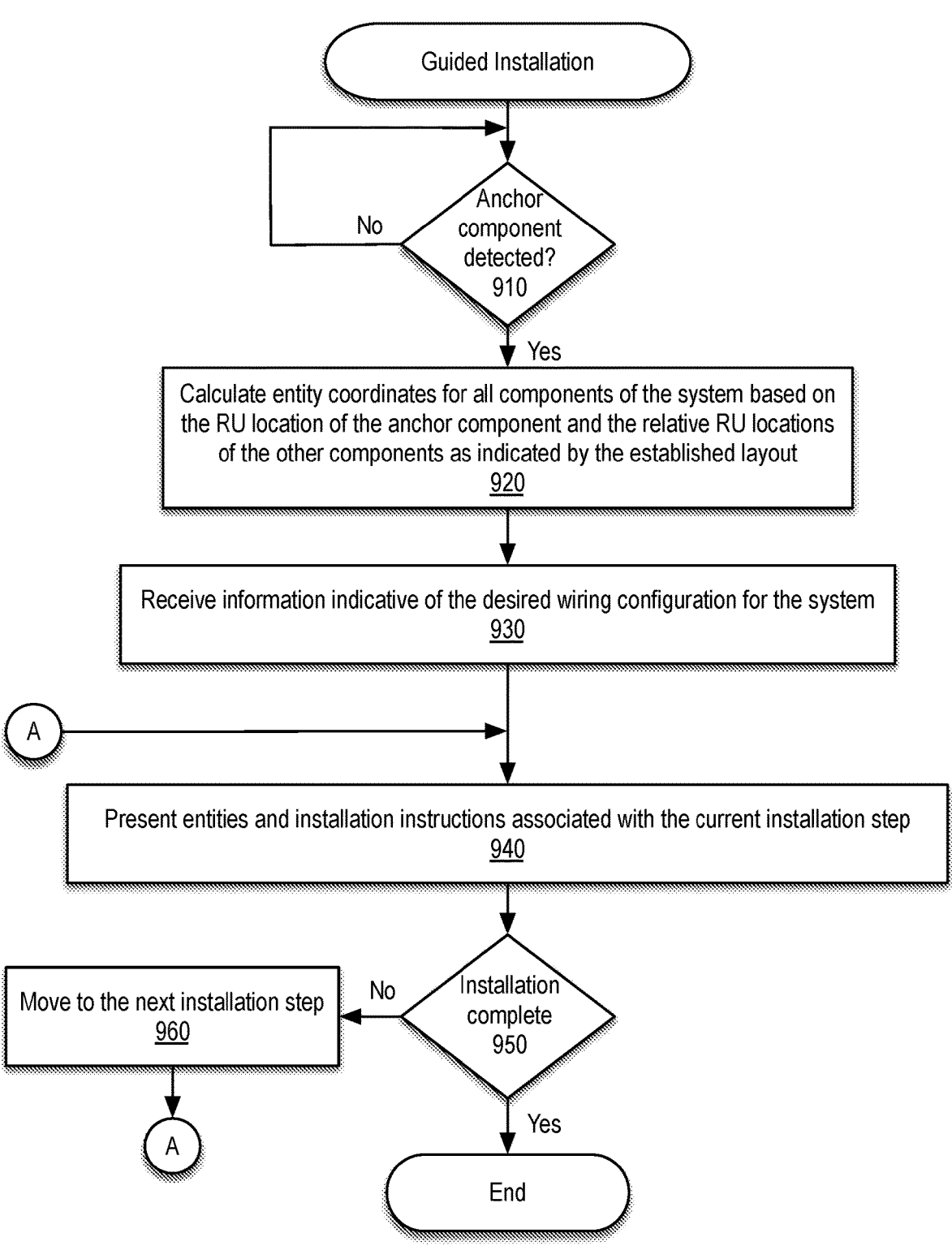
FIG. 9 is a flow diagram illustrating a set of operations for guided installation of system components in accordance with an embodiment of the present disclosure.

FIG. 9 is a flow diagram illustrating a set of operations for guided installation of system components in accordance with an embodiment of the present disclosure. In the context of the present example, it is assumed an end user (e.g., a data center technician) is making use of an AR device (e.g., AR device 110), an AR application (e.g., AR application 112), and a model factory (e.g., model factory 114) to install system components within a rack (e.g., rack 130*a* or rack 130*b*) of a data center 120 as guided by step-by-step installation instructions and corresponding overlay of AR entities. The process described with reference to FIG. 9 may be performed responsive to completion of establishment of a system layout, for example, as described above with reference to FIGS. 7 and 8A-C.

At decision block 910, it is determined whether the specified anchor component of the system configuration has been detected. In one embodiment, the anchor component detection involves performance of an image detection process based on known features of the back panel of the specified anchor component and based on a database of images (e.g., within the model factory) to components within the field of view of the lens of the AR device. For example, as the end user is pointing the lens of the AR device at the rack containing the system components, an image of the back panel of a given component may be compared to the image database. When a match is found in the image database, processing continues with block 920; otherwise, processing loops back to decision block 910 until a match is found. A non-limiting example of a screen shot illustrating a through-the-lens view of the detection of an anchor component is shown and described with reference to FIG. 10. Those skilled in the art will appreciate, other mechanisms may be used to identify the anchor component. For example, an adhesive sticker containing an identifier (e.g., a bar code, a QR code, or text label) may be applied to the anchor component that is indicative of the component at issue.

At block 920, AR entity coordinates are calculated for all components of the system based on the RU location of the anchor component and the relative RU locations of the other components as indicated by an established system layout as well as the X, Y, and Z offsets of the system components relative to the origin (the world locator position) of the world coordinate space. For example, using the coordinates of the AR entities associated with a 3D model (e.g., 3D model 200 or 250) of the system component at issue, each an instance of the AR entities associated with 3D model may be created with appropriate coordinate offsets relative to the position of the anchor component. In the Y-axis, the RU location as well as the offset of the system component at issue from the Y coordinate of the world locator position may be used to calculate the Y coordinates for the system component and associated AR entities in the world coordinate space. In the X-axis and the Z-axis, the offset of the system component at issue from the Y and Z coordinates, respectively, of the world locator position may be used to calculate appropriate Y and Z coordinates for the system component and associated AR entities in the world coordinate space.

In on embodiment, instances of the 3D modeled devices (e.g., derived from the model factory) are created according to the number, type and location of the components of the system configured in the rack layout. Then, each 3D model device instance is trained to its own relative 3D world space location coordinates. In one embodiment, this overlay coordinate precision is +/−1 to 3 millimeters (mm) (X,Y,Z) atop the physical devices as viewed through the lens of the AR device.

At block 930, information indicative of the desired wiring configuration for the system is received. Depending upon the particular implementation, the wiring configuration (e.g., a dual HA wire up or a quad HA wire up) may be ascertainable based on the system components selected for inclusion within the system or the wire configuration may be selected by the end user from a list of available wire up options.

At block 940, the AR entities and installation instructions for a current installation step of the wiring configuration are rendered within the AR view. Non-limiting examples of the display of AR entities and installation instructions are shown and described with reference to FIGS. 11A-J. In one embodiment, the AR entities may already be present within the AR view, but may not be made visible until the current installation step is one that references the back panel elements with which the AR entities are associated.

At decision block 950, it is determined whether all installation steps have been completed. If so, guided installation processing is complete; otherwise, processing continues with block 960 at which the AR application moves to the next installation step and then loops back to block 940.

While in the context of the examples described with reference to FIGS. 5, 7, and FIG. 9, a number of enumerated blocks are included, it is to be understood that other examples may include additional blocks before, after, and/or in between the enumerated blocks. Similarly, in some examples, one or more of the enumerated blocks may be omitted and/or performed in a different order.

Figure 10:
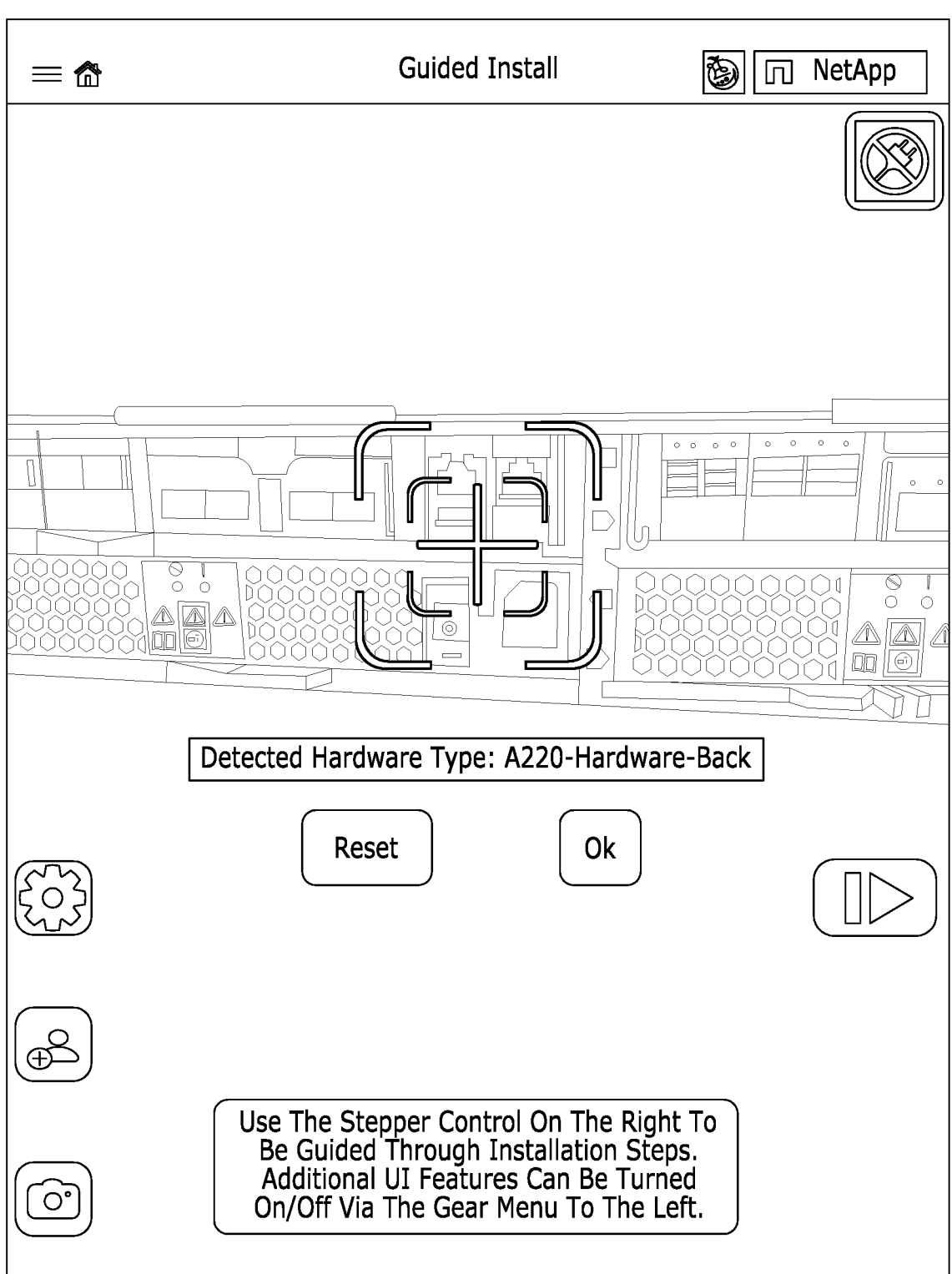
FIG. 10 is a through-the-lens view showing image detection of an anchor component of a system in accordance with an embodiment of the present disclosure.

FIG. 10 is a through-the-lens view showing image detection of an anchor component of a system in accordance with an embodiment of the present disclosure. In the context of the present example, an end user (e.g., a data center technician) upon completion of establishment of the desired system layout within an internal representation of a rack (e.g., rack 810) points the lens of a camera of an AR device (e.g., AR device 110) at a rack (e.g., rack 130*a* or rack 130*b*) of the data center (e.g., data center 120) in which the system components have been mounted within the rack at RU locations corresponding to those established previously via a system layout establishment process.

In one embodiment, an AR application (e.g., AR application 112) periodically captures images of components within the field of view of the camera and causes them to be compared to a database of back panel images to detect a match. For example, for each captured image, the AR application may query the model factory to determine whether the captured image contains the back panel of the specified anchor component of the system.

In the context of the present example, the image detection processing has detected the specified anchor component within the rack and the AR application is prompting the end user whether to accept the detected hardware component or to start over (as multiple system components matching the anchor component may reside with the rack and the AR application may have locked onto a different system component than intended). Upon acceptance of the detected hardware type, the (X, Y, Z) coordinates of a reference point (e.g., reference point 411) associated with the anchor component may be returned to the AR application, for example, as determined by camera driver software of the AR device. In one embodiment, the reference point may be the center point of the back panel of the anchor component in real world space. These coordinates may then be used by the AR application to calculate AR entity coordinates for the anchor component and the other system components based on their respective models and their respective known RU offsets within the rack from the anchor component as described with reference to FIGS. 4 and 9.

Figure 11A:
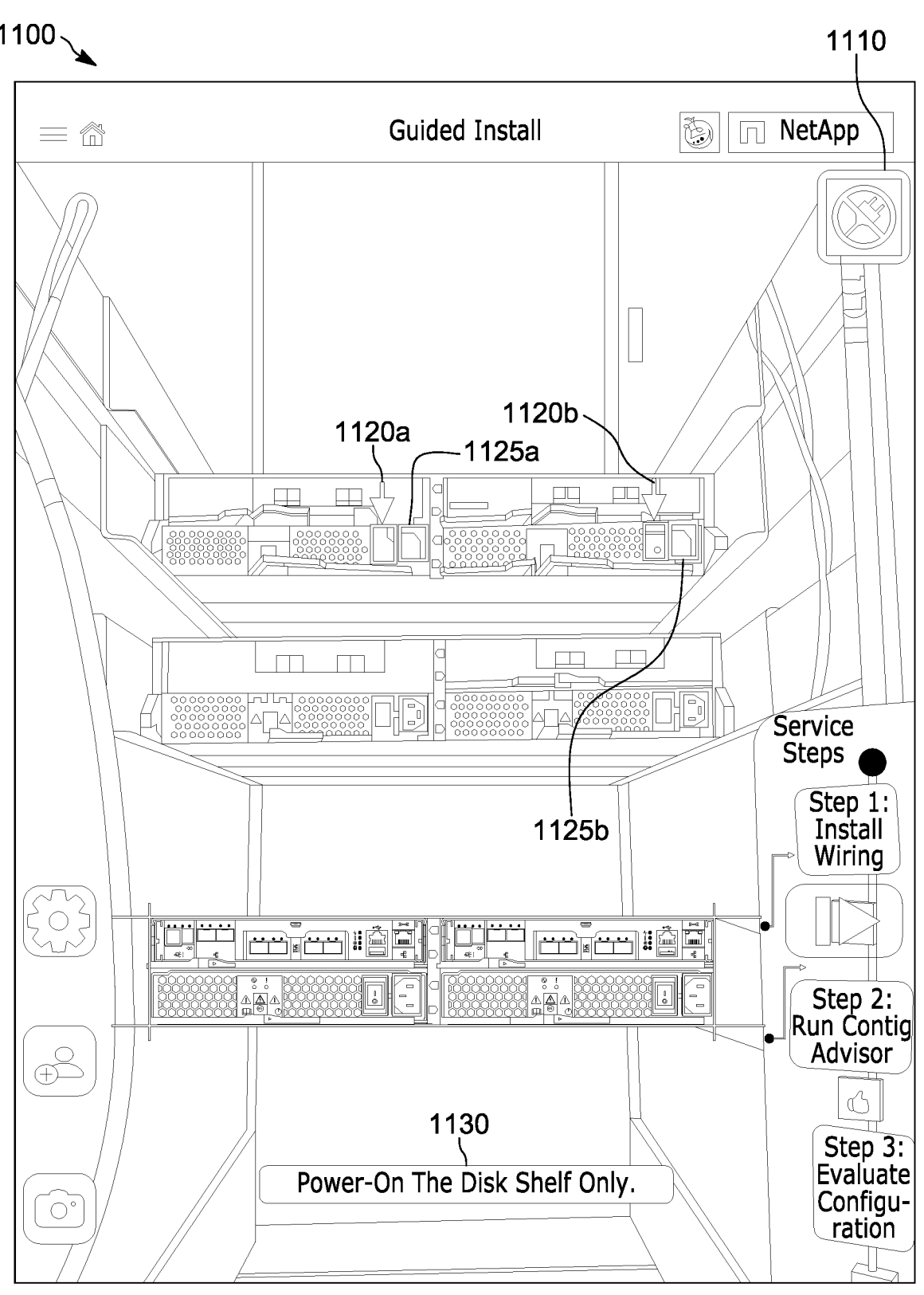
FIG. 11A is a through-the-lens view showing AR entities and instructions for performing a first installation step in accordance with an embodiment of the present disclosure.

FIG. 11A is a through-the-lens view 1100 that may be presented to an end user (e.g., a data center technician) showing AR entities (e.g., 1120*a-b* and 1125*a-b*) and instructions (e.g., 1130) for performing a first installation step in accordance with an embodiment of the present disclosure. In the context of the present example, the first installation step involves powering on a disk shelf AR entities 1125*a-b* show the location of power plugs to which power cables are to be connected during this installation step. Similarly, AR entities 1120*a-b* show the location of power switches to be activated after the power cables are connected.

Figure 11B:
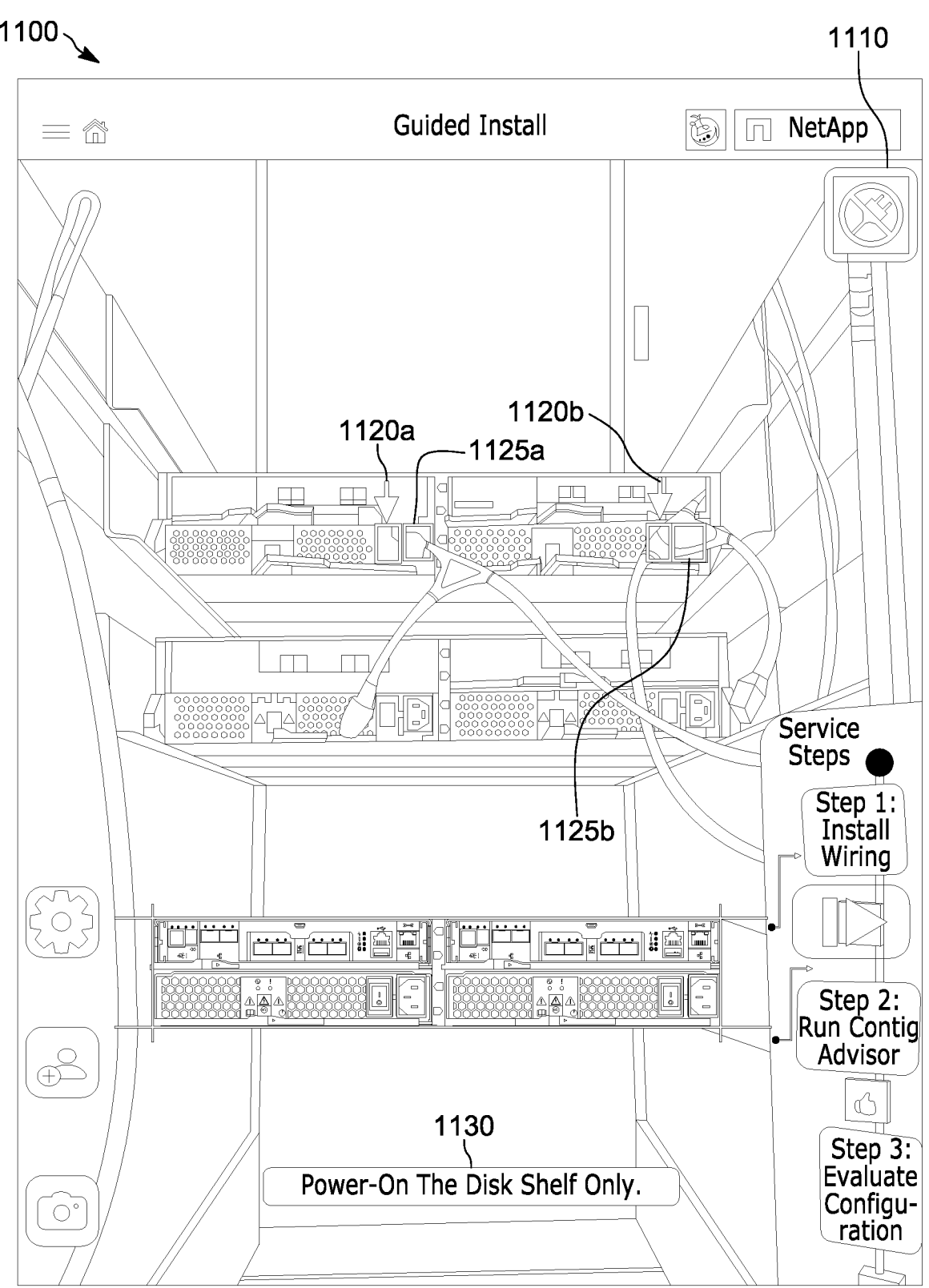
FIG. 11B is a subsequent through-the-lens view showing completion of the first installation step in accordance with an embodiment of the present disclosure.

While in the context of the example described with reference to FIGS. 11A-J textual instructions are presented at 1130, it is to be appreciated text-to-speech functionality may be employed by the AR application to "read" the instructions aloud to the end user. FIG. 11B is a subsequent through-the-lens view showing completion of the first installation step in accordance with an embodiment of the present disclosure. Information (e.g., visual depiction 1110) may also be provided to the end user regarding a current status (e.g., no power) and/or the cable involved in the given installation step. In this example, visual depiction 1110 indicates the current installation step relates to providing power to the system and/or that a power cable is to be used as part of the current installation step.

Similarly, while in the context of the present example, visual port overlays (e.g., AR entities) are shown overlayed on top of the components of the system configuration, as noted above, in some embodiments, a number of different AR renderers may be available, including, for example, a digital twin AR renderer that renders the AR entities within the through-the-lens view to one side or the other of the rack rather than overlaying the AR entities on top of the system components so as to avoid issues resulting from cable occlusion and the like.

In addition, while in the context of the present example, AR entities are used to call attention to various back panel elements (e.g., interfaces, ports, rocker switches, power receptacles and the like), it is contemplated that AR entities may also be presented in connection with providing information regarding cable management best practices.

Figure 11C:
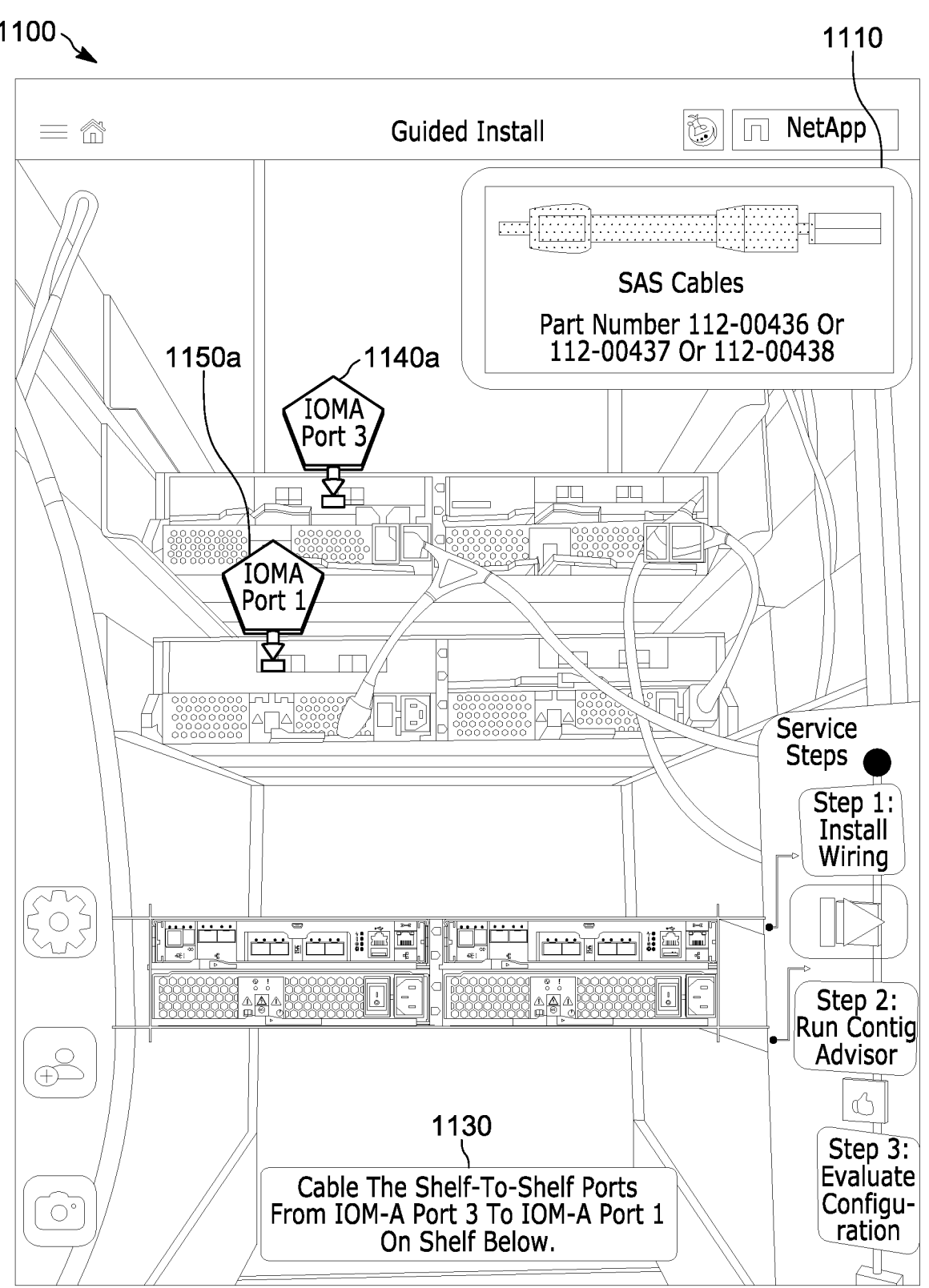
FIG. 11C is a through-the-lens view showing AR entities and instructions for performing a second installation step in accordance with an embodiment of the present disclosure.

FIG. 11C is a through-the-lens view showing AR entities and instructions for performing a second installation step in accordance with an embodiment of the present disclosure. In the context of the present example, the second installation step involves performing shelf-to-shelf cabling from TOM A port 3 to TOM A port 1 on the shelf below.

In this example, visual depiction 1110 indicates the current installation step involves the use of a particular type of cable (e.g., a serial-attached SCSI (SAS) cable having an identified part number).

Figure 11D:
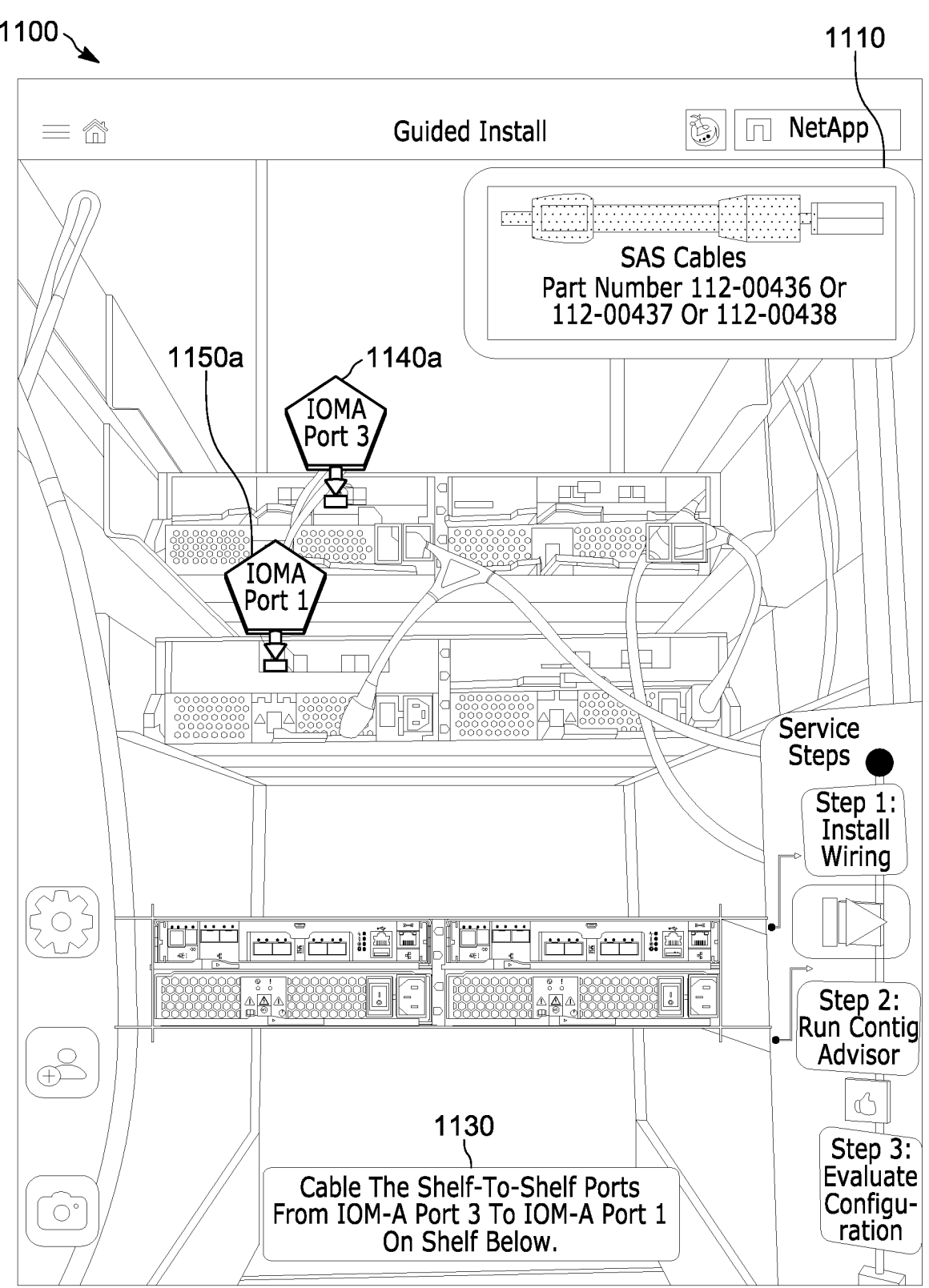
FIG. 11D is a subsequent through-the-lens view showing completion of the second installation step in accordance with an embodiment of the present disclosure.

Additionally, AR entities 1140*a* and 1150*a* in the form of port badges may be displayed to call the end user's attention to the correct ports on the back panels of the system components at issue. In one embodiment, the port badges seek to enhance the visibility of the ports involved in the particular step of the wire up and help to avoid wiring of the wrong ports. FIG. 11D is a subsequent through-the-lens view showing completion of the second installation step in accordance with an embodiment of the present disclosure.

Figure 11E:
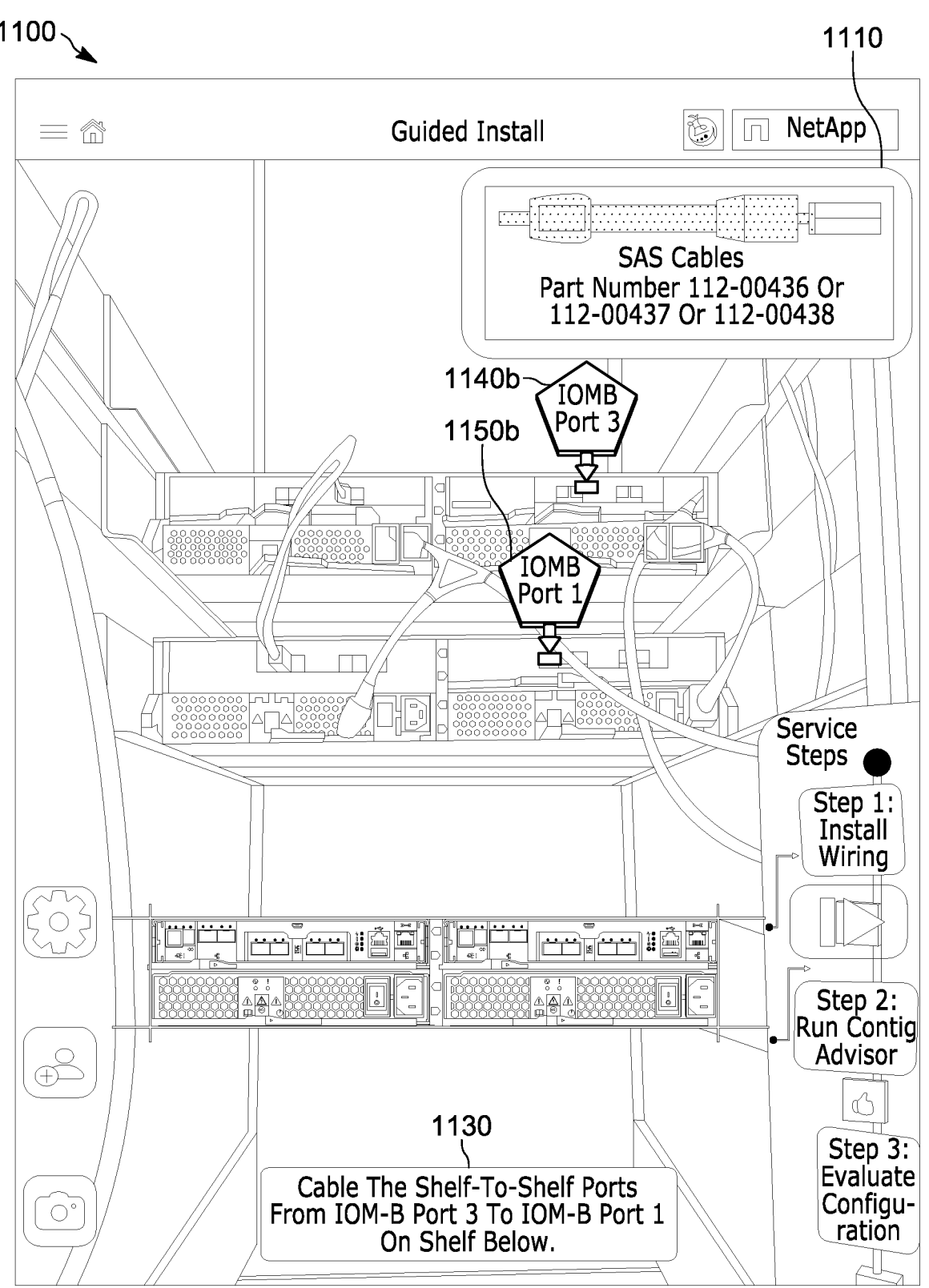
FIG. 11E is a through-the-lens view showing AR entities and instructions for performing a third installation step in accordance with an embodiment of the present disclosure.
Figure 11F:
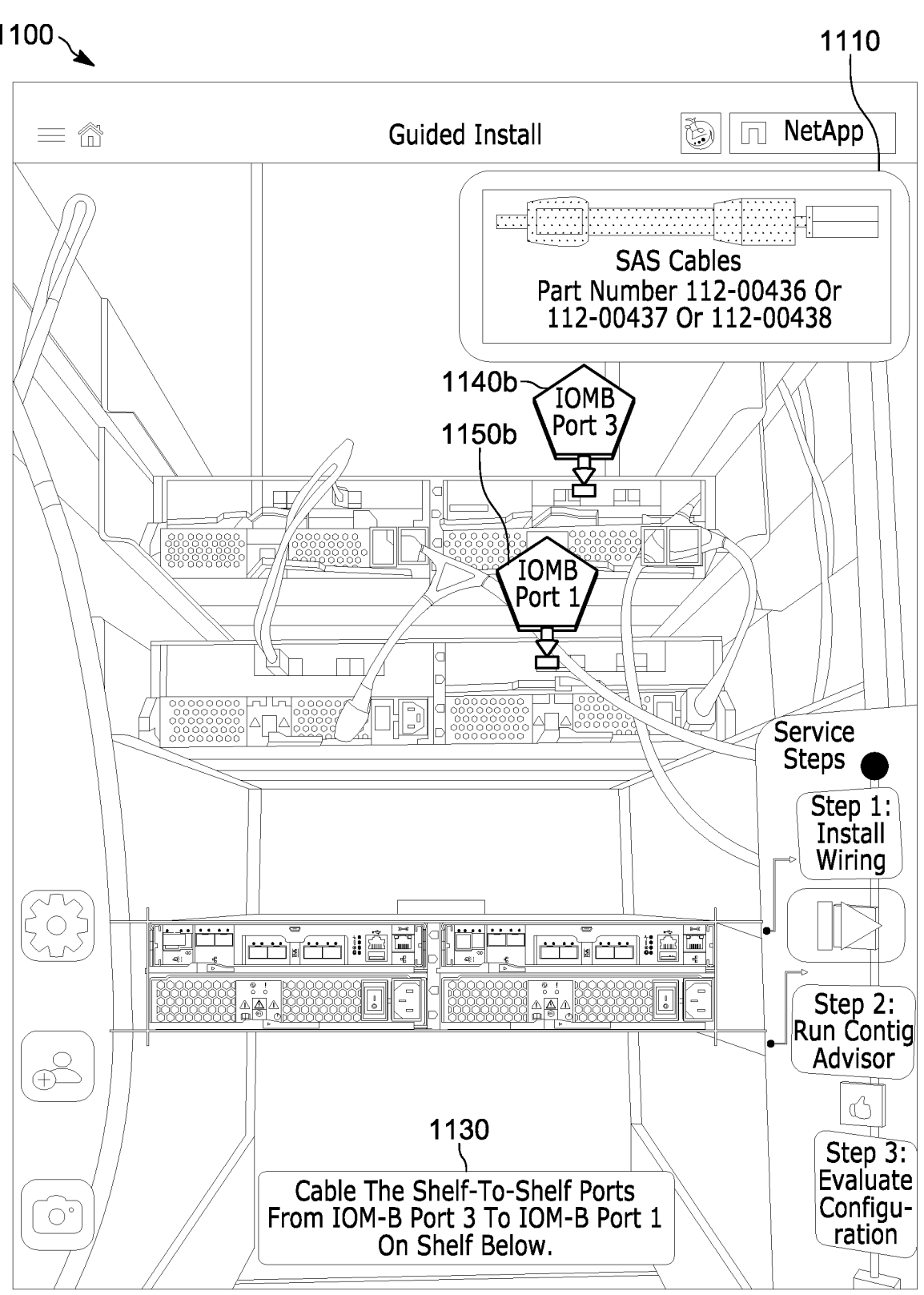
FIG. 11F is a subsequent through-the-lens view showing completion of the third installation step in accordance with an embodiment of the present disclosure.

FIG. 11E is a through-the-lens view showing AR entities and instructions for performing a third installation step in accordance with an embodiment of the present disclosure. In the context of the present example, the third installation step involves performing shelf-to-shelf cabling from IOM B port 3 to IOM B port 1 on the shelf below. AR entities 1140*b* and 1150*b* in the form of port badges may be displayed to call the end user's attention to the correct ports on the back panels of the system components at issue. FIG. 11F is a subsequent through-the-lens view showing completion of the third installation step in accordance with an embodiment of the present disclosure.

Figure 11G:
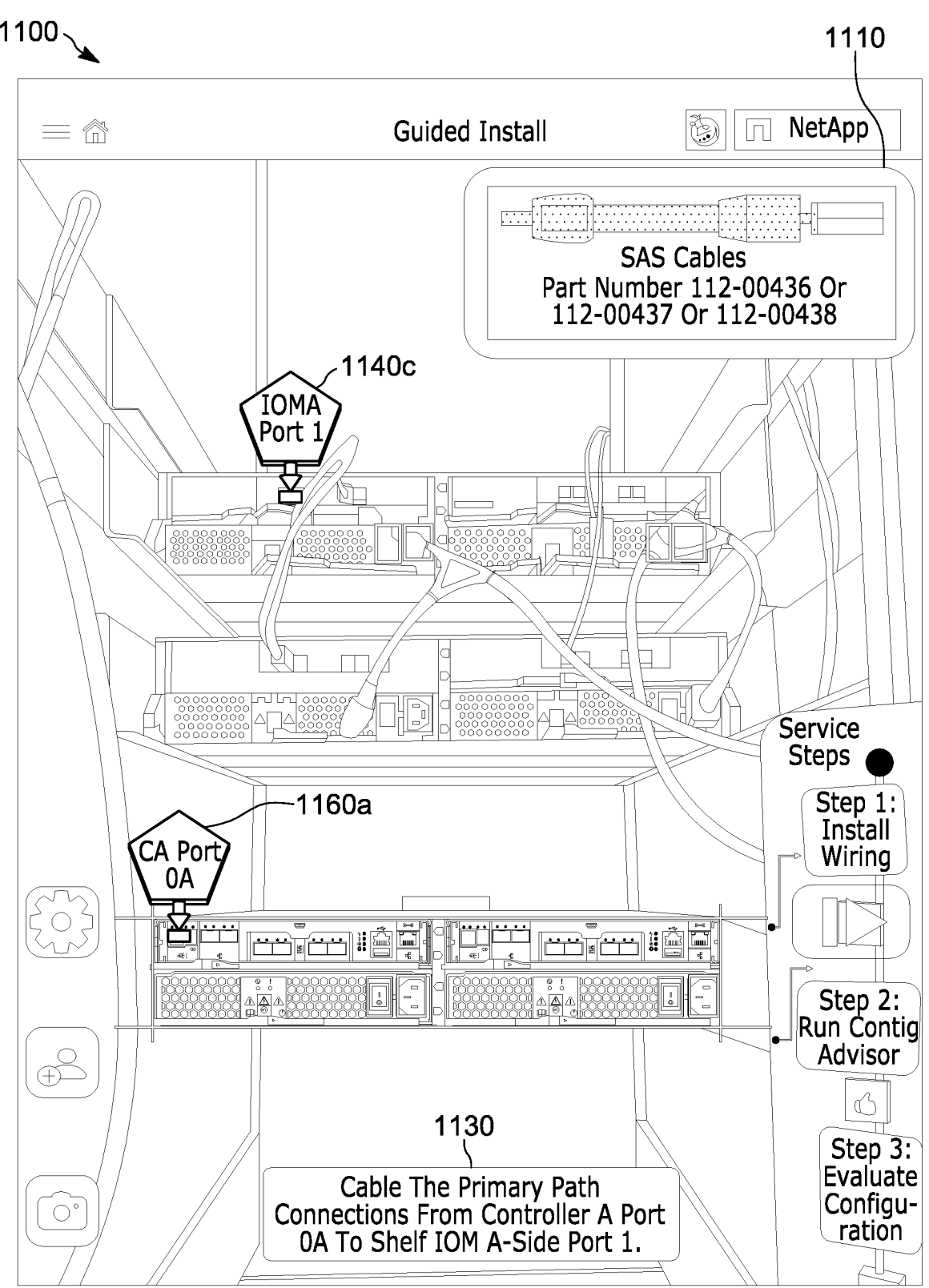
FIG. 11G is a through-the-lens view showing AR entities and instructions for performing a fourth installation step in accordance with an embodiment of the present disclosure.

FIG. 11G is a through-the-lens view showing AR entities and instructions for performing a fourth installation step in accordance with an embodiment of the present disclosure. In the context of the present example, the fourth installation step involves performing cabling of the primary path connections from the A-side controller port OA to shelf IOM A-side port 1. As above, AR entities 1140*c* and 1160*a* in the form of port badges may be displayed to call the end user's attention to the correct ports on the back panels of the system components at issue.

Figure 11H:
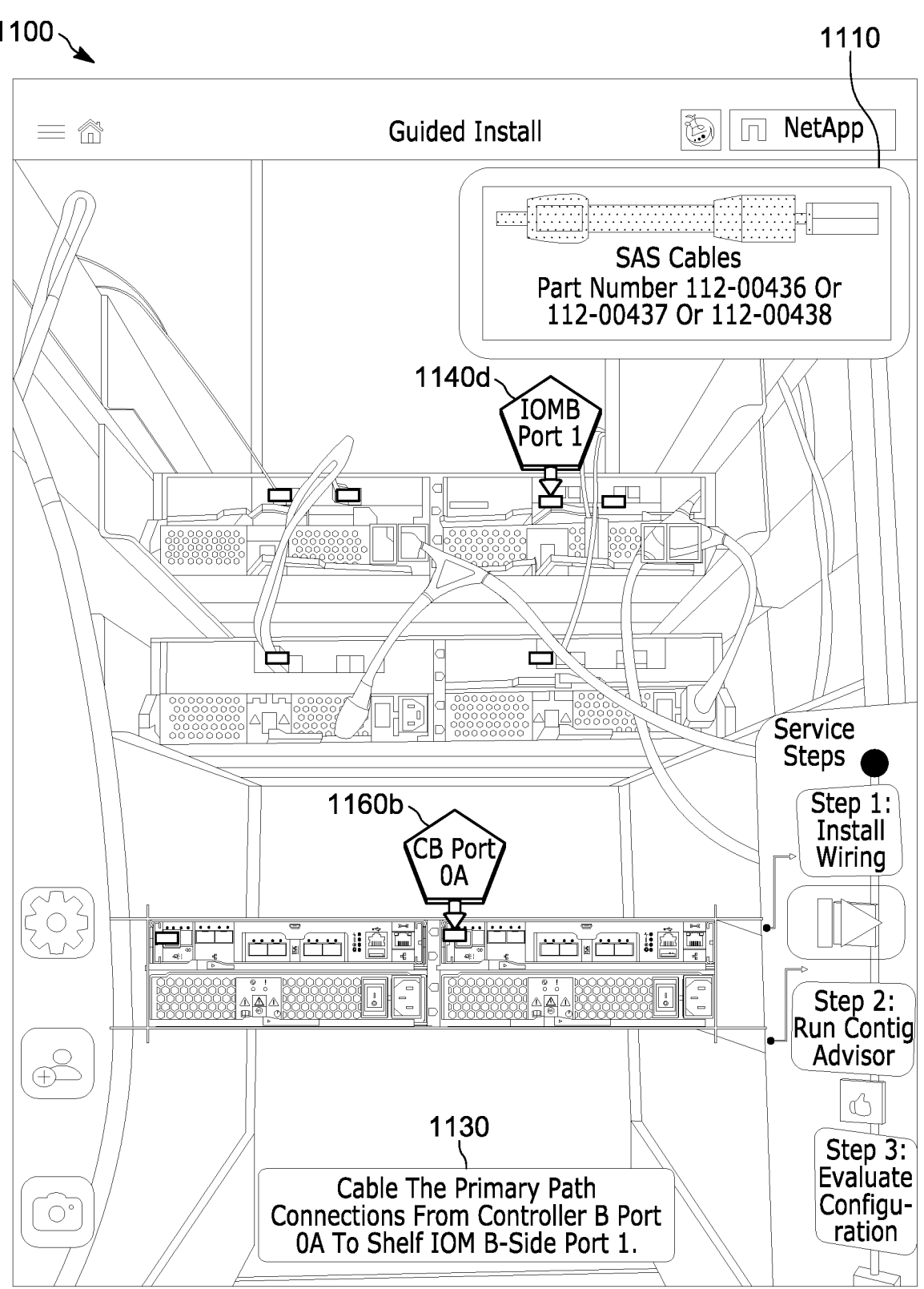
FIG. 11H is a through-the-lens view showing AR entities and instructions for performing a fifth installation step in accordance with an embodiment of the present disclosure.

FIG. 11H is a through-the-lens view showing AR entities and instructions for performing a fifth installation step in accordance with an embodiment of the present disclosure. In the context of the present example, the fifth installation step involves performing cabling of the primary path connections from the B-side controller port OA to shelf TOM B-side port 1. As above, AR entities 1140*d* and 1160*b* in the form of port badges may be displayed to call the end user's attention to the correct ports on the back panels of the system components at issue.

Figure 11I:
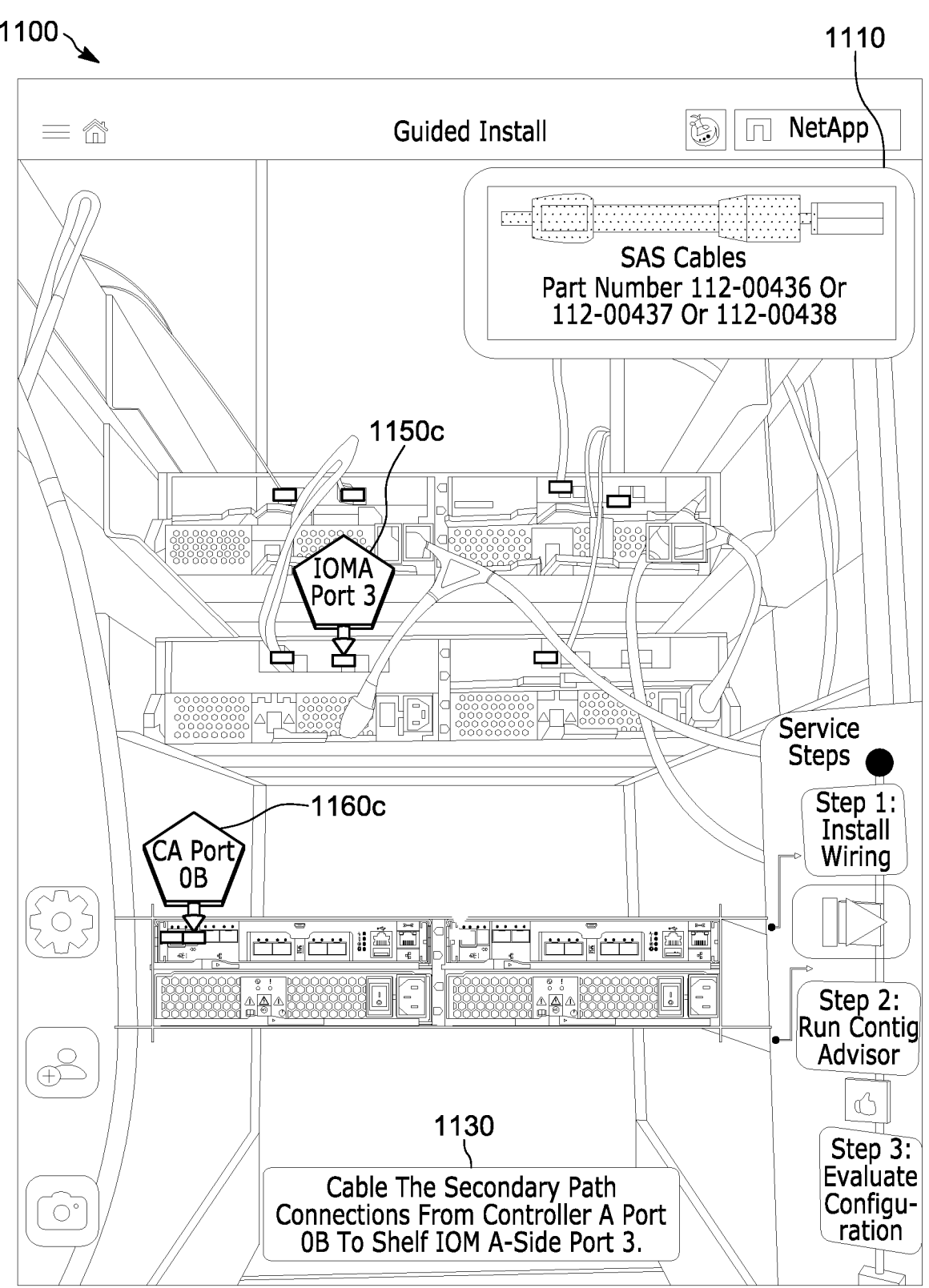
FIG. 11I is a through-the-lens view showing AR entities and instructions for performing a sixth installation step in accordance with an embodiment of the present disclosure.

FIG. 11I is a through-the-lens view showing AR entities and instructions for performing a sixth installation step in accordance with an embodiment of the present disclosure. In the context of the present example, the sixth installation step involves performing cabling of the secondary path connections from the A-side controller port OB to shelf IOM A-side port 3. As above, AR entities 1150*c* and 1160*c* in the form of port badges may be displayed to call the end user's attention to the correct ports on the back panels of the system components at issue.

Figure 11J:
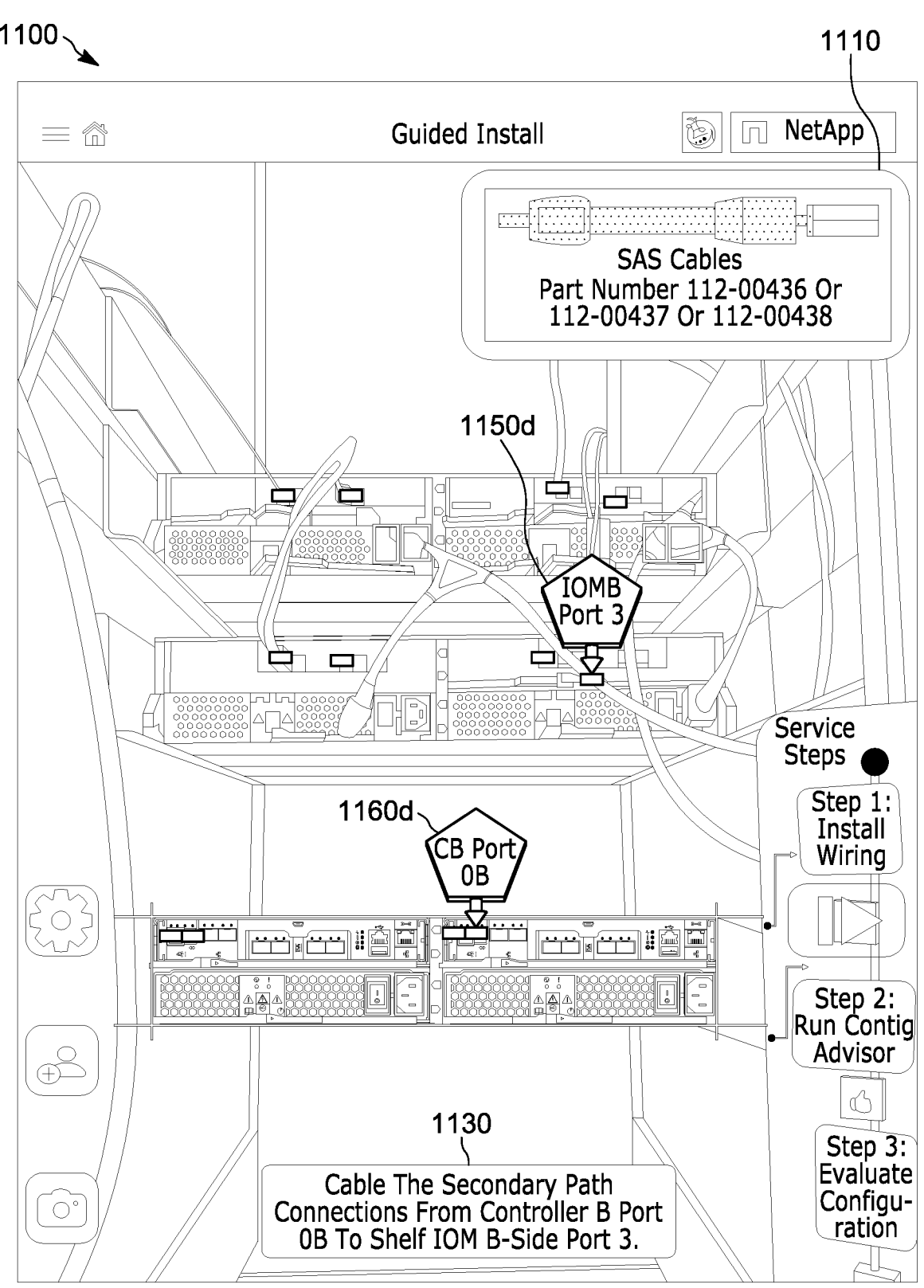
FIG. 11J is a through-the-lens view showing AR entities and instructions for performing a seventh installation step in accordance with an embodiment of the present disclosure.

FIG. 11J is a through-the-lens view showing AR entities and instructions for performing a seventh installation step in accordance with an embodiment of the present disclosure. In the context of the present example, the seventh installation step involves performing cabling of the secondary path connections from the B-side controller port OB to shelf IOM B-side port 3. As above, AR entities 1150*d* and 1160*d* in the form of port badges may be displayed to call the end user's attention to the correct ports on the back panels of the system components at issue.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 12:
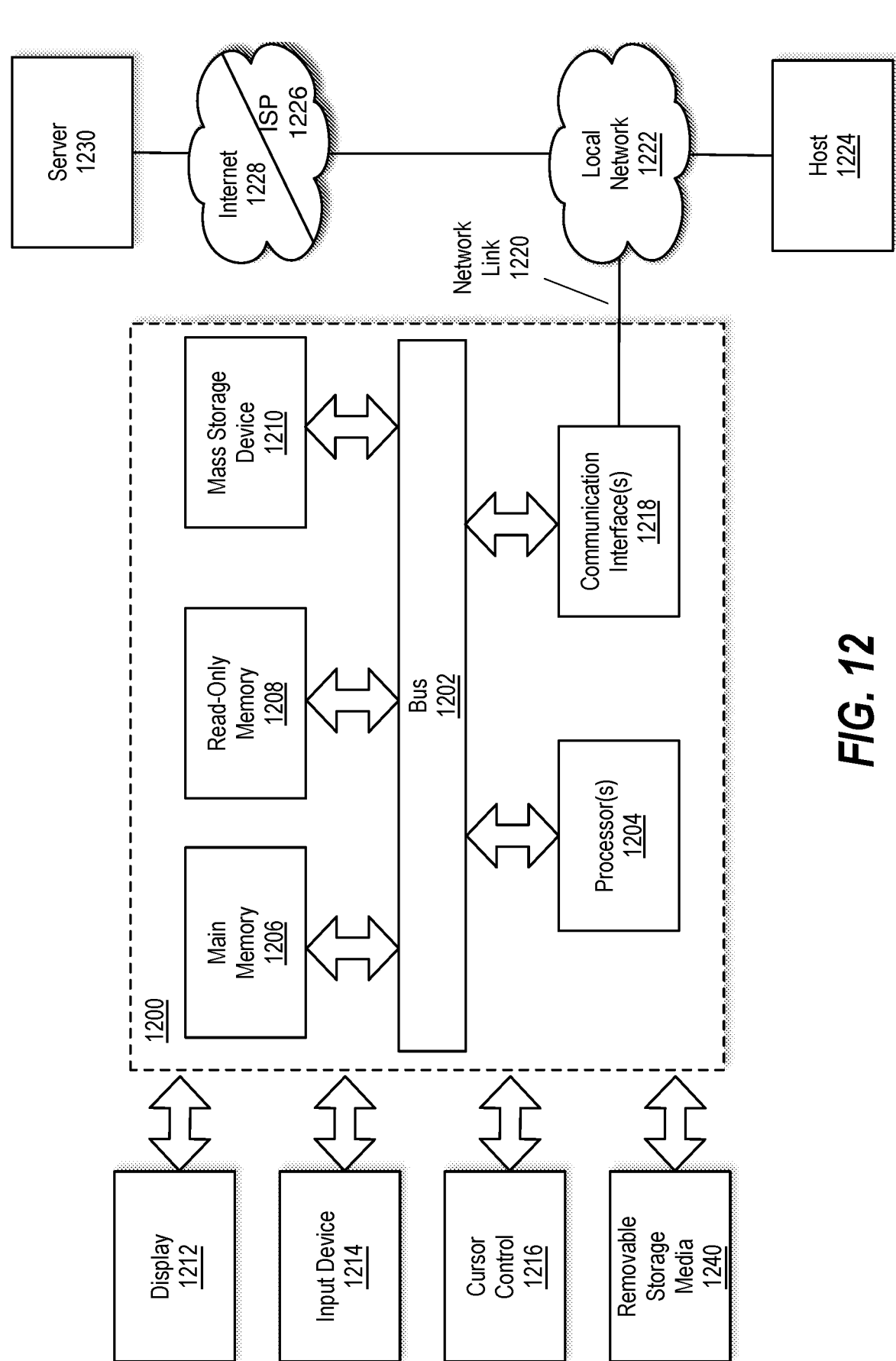
FIG. 12 illustrates an example computer system in which or with which embodiments of the present disclosure may be utilized.

FIG. 12 is a block diagram that illustrates a computer system 1200 in which or with which an embodiment of the present disclosure may be implemented. Computer system 1200 may be representative of all or a portion of the computing resources associated with an AR device (e.g., AR device 110) or an outboard wireless connected device (e.g., a smartphone) coupled thereto via a high-speed wireless connection. Notably, components of computer system 1200 described herein are meant only to exemplify various possibilities. In no way should example computer system 1200 limit the scope of the present disclosure. In the context of the present example, computer system 1200 includes a bus 1202 or other communication mechanism for communicating information, and a processing resource (e.g., a hardware processor 1204) coupled with bus 1202 for processing information. Hardware processor 1204 may be, for example, a general purpose microprocessor.

Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, e.g., a magnetic disk, optical disk or flash disk (made of flash memory chips), is provided and coupled to bus 1202 for storing information and instructions.

Computer system 1200 may be coupled via bus 1202 to a display 1212, e.g., a cathode ray tube (CRT), Liquid Crystal Display (LCD), Organic Light-Emitting Diode Display (OLED), Digital Light Processing Display (DLP) or the like, for displaying information to a computer user. An input device 1214, including alphanumeric and other keys, is coupled to bus 1202 for communicating information and command selections to processor 1204. Another type of user input device is cursor control 1216, such as a mouse, a trackball, a trackpad, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Removable storage media 1240 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 1200 may implement the techniques described herein using customized hard-wired logic, one or more ASICs or FPGAs, firmware or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 1210. Volatile media includes dynamic memory, such as main memory 1206. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world-wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218. The received code may be executed by processor 1204 as it is received, or stored in storage device 1210, or other non-volatile storage for later execution.

All examples and illustrative references are non-limiting and should not be used to limit the applicability of the proposed approach to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An augmented reality (AR) device comprising:
one or more processing resources; and
instructions that when executed by the one or more processing resources cause the AR device to:
identify an anchor component within a through-the-lens view of a subset of a plurality of information technology (IT) components mounted within a rack;
determine a location of the anchor component within an AR world coordinate space;
determine a location of a given IT component of the plurality of IT components other than the anchor component within the AR world coordinate space based on the location of the anchor component and a placement of the given IT component within the rack relative to the anchor component; and
based on the location of the given IT component, create an instance of a three-dimensional (3D) model of the given IT component within the AR world coordinate space including a plurality of AR overlay entities, wherein each of the plurality of AR overlay entities corresponds to a back panel element of a back panel of the given IT component.

2. The AR device of claim 1, wherein the instructions further cause the AR device to receive input indicative of the anchor component and input indicative of one or more additional IT components of the plurality of IT components.

3. The AR device of claim 2, wherein the instructions further cause the AR device to receive input indicative of the placement of each of the plurality of IT components within the rack.

4. The AR device of claim 3, wherein receipt of the input indicative of the placement of each of the plurality of IT components within the rack is performed via a drag-and-drop interface.

5. The AR device of claim 1, wherein coordinates of a given AR entity of the plurality of AR entities is determined based on a model of the given IT component represented within a model factory and the location of the given IT component within the AR world coordinate space, wherein the model facilitates overlaying of a given AR overlay entity of the plurality of AR overlay entities with respect to the corresponding back panel element within the through-the-lens view with a precision of 1 to 3 millimeters.

6. The AR device of claim 5, wherein the anchor component is part of a desired configuration of a system made up of the plurality IT components and wherein the instructions further cause the AR device to:

receive information indicative of a desired wiring configuration for the system; and facilitate correct wire-up of the system by a data center technician in accordance with the desired wiring configuration by, for each installation step of a plurality of installation steps associated with the desired wiring configuration:

presenting to the data center technician via a display of the AR device a through-the-lens view of respective back panels of one or more IT components of the plurality of IT components involved in the installation step;

providing the data center technician with instructions associated with the installation step; and calling the data center technician's attention to one or more back panel elements of the one or more IT components involved in the installation step by overlaying within the through-the-lens view one or more corresponding AR entities of the plurality of AR entities on the one or more IT components.

7. The AR device of claim 1, wherein the back panel element comprises an interface, a port, a rocker switch, or a power receptacle of the IT component.

8. The AR device of claim 1, wherein identification of the anchor component comprises performing an image detection process including comparing known features of a back panel of the anchor component with those of one or more components of the plurality of IT components within a field of view of a lens of the AR device.

9. The AR device of claim 1, wherein the placement of the given IT component within the rack relative to the anchor component is determined based on a rack unit (RU) offset between a first set of one or more RUs in which the anchor component is mounted within the rack and a second set of one or more RUs in which the given IT component is mounted within the rack.

10. A method comprising:

identifying, by a portable computer system operating as an augmented reality (AR) device, an anchor component within a through-the-lens view of a subset of a plurality of information technology (IT) components mounted within a rack;

determining, by the portable computer system, a location of the anchor component within an AR world coordinate space;

determining, by the portable computer system, a location of a given IT component of the plurality of IT components other than the anchor component within the AR world coordinate space based on the location of the anchor component and a placement of the given IT component within the rack relative to the anchor component; and based on the location of the given IT component, creating, by the portable computer system, an instance of a three-dimensional (3D) model of the given IT component within the AR world coordinate space including a plurality of AR overlay entities, wherein each of the plurality of AR overlay entities corresponds to a back panel element of a back panel of the given IT component.

11. The method of claim 10, further comprising receiving, by the portable computer system, input indicative of the anchor component and input indicative of one or more additional IT components of the plurality of IT components.

12. The method of claim 11, further comprising receiving, by the portable computer system, input indicative of the placement of each of the plurality of IT components within the rack.

13. The method of claim 12, wherein said receiving, by the portable computer system, input indicative of the placement of each of the plurality of IT components within the rack is performed via a drag-and-drop interface provided by the portable computer system.

14. The method of claim 10, wherein coordinates of a given AR entity of the plurality of AR entities is determined based on a model of the given IT component represented within a model factory and the location of the given IT component within the AR world coordinate space, wherein the model facilitates overlaying of a given AR overlay entity of the plurality of AR overlay entities with respect to the corresponding back panel element within the through-the-lens view with a precision of 1 to 3 millimeters.

15. A method comprising:

identifying, by a portable computer system operating as an augmented reality (AR) device, an anchor component within a through-the-lens view of a subset of a plurality of information technology (IT) components mounted within a rack;

determining, by the portable computer system, a location of the anchor component within an AR world coordinate space;

determining, by the portable computer system, a location of a given IT component of the plurality of IT components other than the anchor component within the AR world coordinate space based on the location of the anchor component and a placement of the given IT component within the rack relative to the anchor component; and based on the location of the given IT component, creating, by the portable computer system, an instance of a three-dimensional (3D) model of the given IT component within the AR world coordinate space including a plurality of AR overlay entities, wherein each of the plurality of AR overlay entities corresponds to a back panel element of a back panel of the given IT component.

16. The method of claim 15, wherein said identifying comprises performing an image detection process including comparing known features of a back panel of the anchor component with those of one or more components of the plurality of IT components within a field of view of a lens of the portable computer system.

17. The method of claim 10, wherein the placement of the given IT component within the rack relative to the anchor component is determined based on a rack unit (RU) offset between a first set of one or more RUs in which the anchor component is mounted within the rack and a second set of one or more RUs in which the given IT component is mounted within the rack.

18. The method of claim 15, wherein the back panel element comprises an interface, a port, a rocker switch, or a power receptacle of the IT component.

19. The method of claim 15, wherein the placement of the given IT component within the rack relative to the anchor component is determined based on a rack unit (RU) offset between a first set of one or more RUs in which the anchor component is mounted within the rack and a second set of one or more RUs in which the given IT component is mounted within the rack.

20. A non-transitory machine readable medium storing instructions, which when executed by one or more processing resource of a portable computer system operating as an augmented reality (AR) device, cause the AR device to:

identify an anchor component within a through-the-lens view of a subset of a plurality of information technology (IT) components mounted within a rack;

determine a location of the anchor component within an AR world coordinate space;

determine a location of a given IT component of the plurality of IT components other than the anchor component within the AR world coordinate space based on the location of the anchor component and a placement of the given IT component within the rack relative to the anchor component; and based on the location of the given IT component, create an instance of a three-dimensional (3D) model of the given IT component within the AR world coordinate space including a plurality of AR overlay entities, wherein each of the plurality of AR overlay entities corresponds to a back panel element of a back panel of the given IT component.

21. The non-transitory machine readable medium of claim 20, wherein the instructions further cause the AR device to receive input indicative of the anchor component and input indicative of one or more additional IT components of the plurality of IT components.

22. The non-transitory machine readable medium of claim 21, wherein the instructions further cause the AR device to receive input indicative of the placement of each of the plurality of IT components within the rack.

23. The non-transitory machine readable medium of claim 22, wherein receipt of the input indicative of the placement of each of the plurality of IT components within the rack is performed via a drag-and-drop interface.

24. The non-transitory machine readable medium of claim 20, wherein coordinates of a given AR entity of the plurality of AR entities is determined based on a model of the given IT component represented within a model factory and the location of the given IT component within the AR world coordinate space, wherein the model facilitates overlaying of a given AR overlay entity of the plurality of AR overlay entities with respect to the corresponding back panel element within the through-the-lens view with a precision of 1 to 3 millimeters.

25. The non-transitory machine readable medium of claim 24, wherein the anchor component is part of a desired configuration of a system made up of the plurality IT components and wherein the instructions further cause the AR device to:

receive information indicative of a desired wiring configuration for the system; and facilitate correct wire-up of the system by a data center technician in accordance with the desired wiring configuration by, for each installation step of a plurality of installation steps associated with the desired wiring configuration:

presenting to the data center technician via a display of the AR device a through-the-lens view of respective back panels of one or more IT components of the plurality of IT components involved in the installation step;

providing the data center technician with instructions associated with the installation step; and calling the data center technician's attention to one or more back panel elements of the one or more IT components involved in the installation step by overlaying within the through-the-lens view one or more corresponding AR entities of the plurality of AR entities on the one or more IT components.

26. The non-transitory machine readable medium of claim 20, wherein the back panel element comprises an interface, a port, a rocker switch, or a power receptacle of the IT component.

27. The non-transitory machine readable medium of claim 20, wherein identification of the anchor component comprises performing an image detection process including comparing known features of a back panel of the anchor component with those of one or more components of the plurality of IT components within a field of view of a lens of the AR device.

28. The non-transitory machine readable medium of claim 20, wherein the placement of the given IT component within the rack relative to the anchor component is determined based on a rack unit (RU) offset between a first set of one or more RUs in which the anchor component is mounted within the rack and a second set of one or more RUs in which the given IT component is mounted within the rack.

* * * * *